(12) United States Patent
Sundnes

(10) Patent No.: US 12,332,028 B2
(45) Date of Patent: Jun. 17, 2025

(54) COMPOSITE MATERIAL

(71) Applicant: John Phillip Sundnes, Karaka (NZ)

(72) Inventor: John Phillip Sundnes, Karaka (NZ)

( * ) Notice: Subject to any disclaimer, the term of this patent is extended or adjusted under 35 U.S.C. 154(b) by 215 days.

(21) Appl. No.: 16/976,014

(22) PCT Filed: Feb. 27, 2019

(86) PCT No.: PCT/US2019/019702
§ 371 (c)(1),
(2) Date: Aug. 26, 2020

(87) PCT Pub. No.: WO2019/168884
PCT Pub. Date: Sep. 6, 2019

(65) Prior Publication Data
US 2023/0135976 A1    May 4, 2023

(51) Int. Cl.
| | |
|---|---|
| *B32B 3/12* | (2006.01) |
| *B32B 3/18* | (2006.01) |
| *B32B 3/30* | (2006.01) |
| *B32B 5/02* | (2006.01) |
| *B32B 7/08* | (2019.01) |
| *B32B 7/12* | (2006.01) |
| *B32B 25/16* | (2006.01) |
| *B63C 11/04* | (2006.01) |
| *F41H 5/013* | (2006.01) |
| *F41H 5/04* | (2006.01) |

(52) U.S. Cl.
CPC ............ *F41H 5/0492* (2013.01); *B32B 3/18* (2013.01); *B32B 3/30* (2013.01); *B32B 5/028* (2013.01); *B32B 7/08* (2013.01); *B32B 7/12* (2013.01); *B32B 25/16* (2013.01); *F41H 5/013* (2013.01); *B32B 2307/51* (2013.01); *B32B 2307/581* (2013.01); *B32B 2307/7265* (2013.01); *B32B 2437/00* (2013.01); *B32B 2571/02* (2013.01); *B63C 11/04* (2013.01); *B63C 2011/046* (2013.01)

(58) Field of Classification Search
CPC ............... B63C 11/04; B63C 2011/046; B32B 2437/00; B32B 2307/581; B32B 3/12; B32B 3/18; B32B 7/08; B32B 7/12; F41H 5/0492
See application file for complete search history.

(56) References Cited

U.S. PATENT DOCUMENTS

2012/0052231 A1* 3/2012 Sundnes ............ A41D 31/245
428/101

* cited by examiner

*Primary Examiner* — Joanna Pleszczynska
(74) *Attorney, Agent, or Firm* — MOSER TABOADA

(57) ABSTRACT

A composite material (10) comprising:
  a base layer (48);
  a plurality of protective plates (41, 51, 51a, 51b) located on the base layer (48);
  an attaching means (43) to connect the base layer (48) to the protective plates (41), wherein
the attaching means (43) is positioned along a first direction (46) on the base layer (48) to resist pivoting of each protective plate (41, 51, 51a, 51b) about an axis normal to the base layer (48).

16 Claims, 37 Drawing Sheets

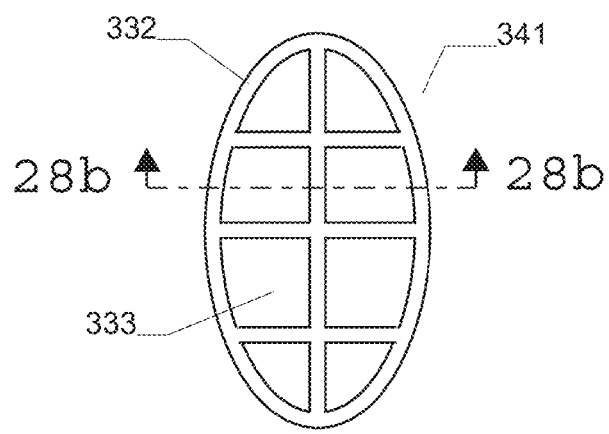
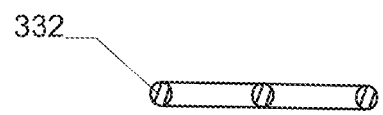
Figure 28a        Figure 28b
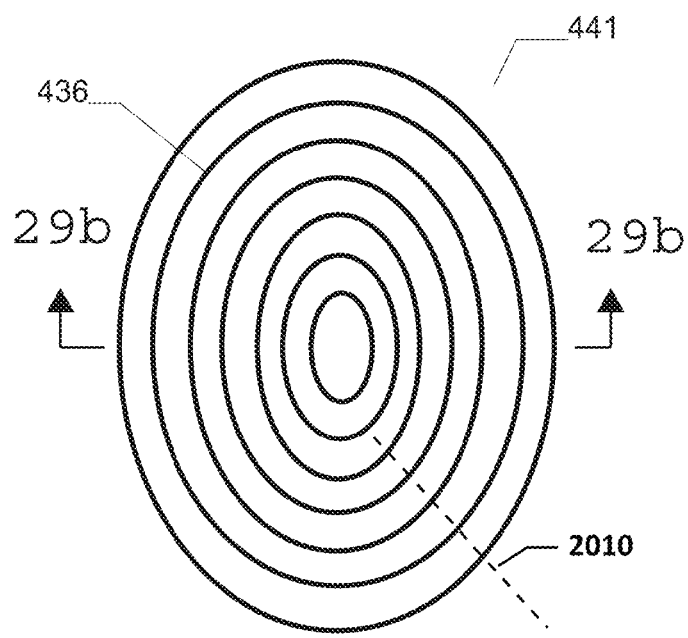
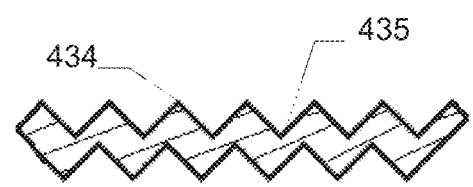
Figure 29a        Figure 29b
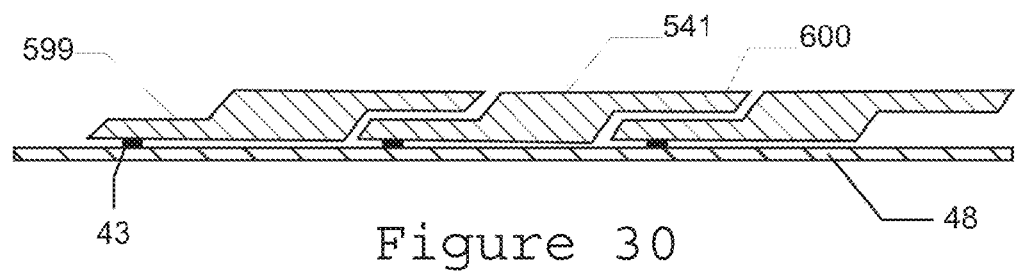
Figure 30

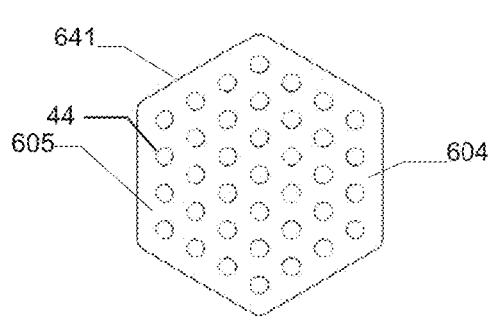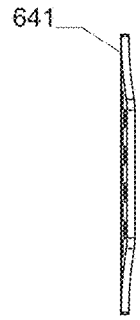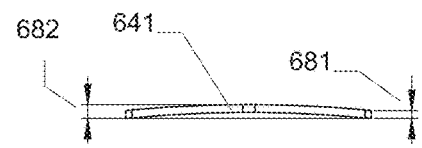
Figure 31a     Figure 31b     Figure 31c
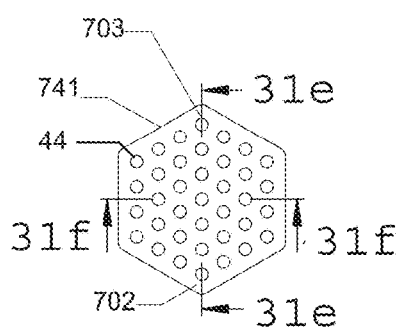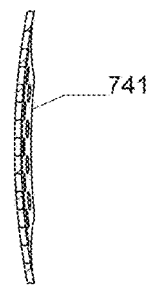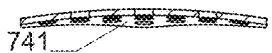
Figure 31d     Figure 31e     Figure 31f
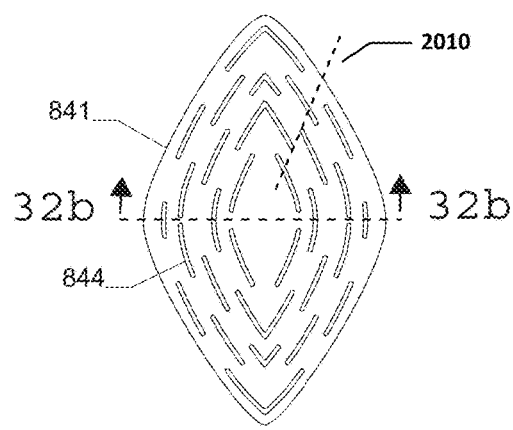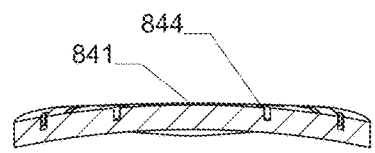
Figure 32a     Figure 32b

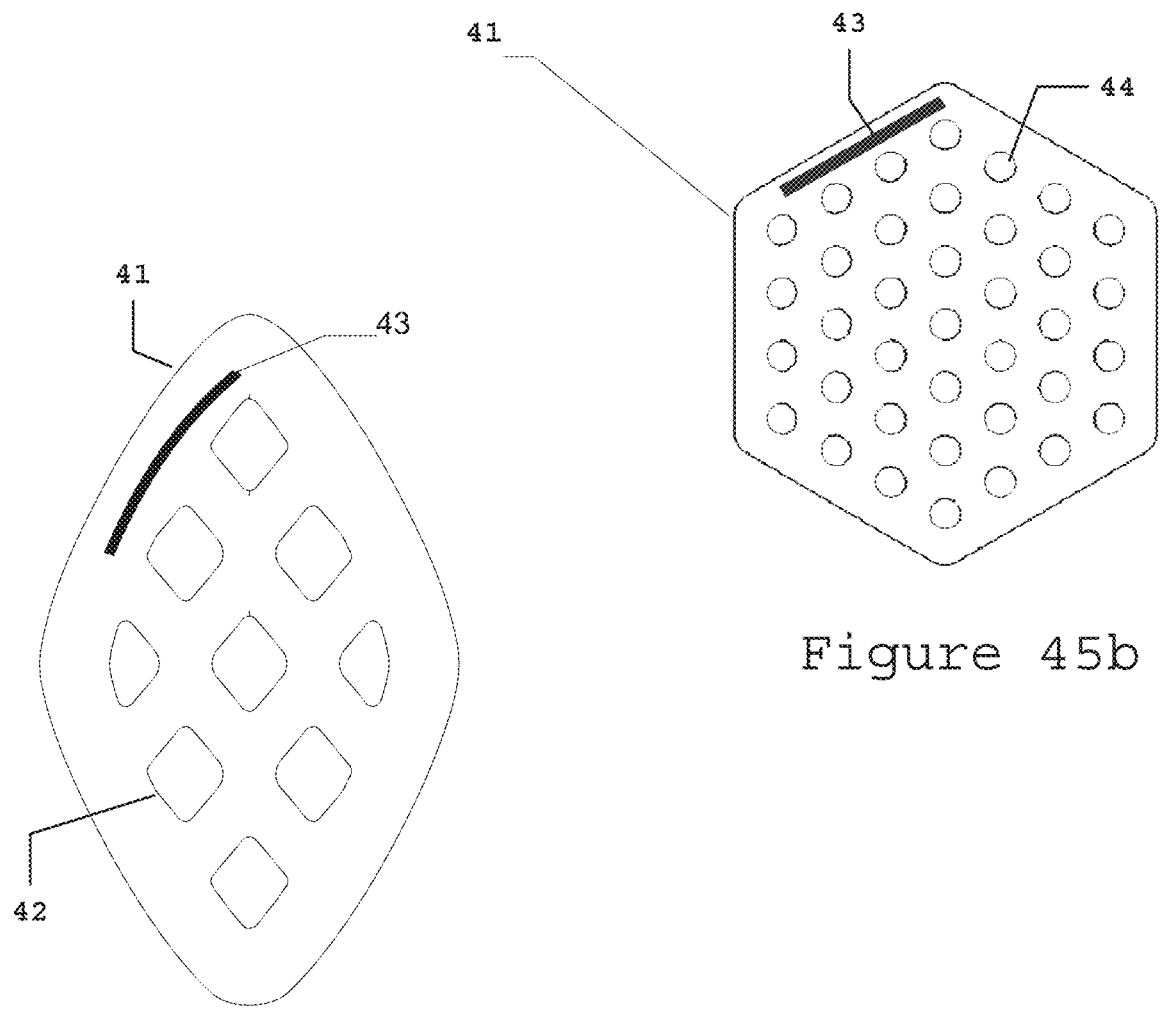
Figure 45b
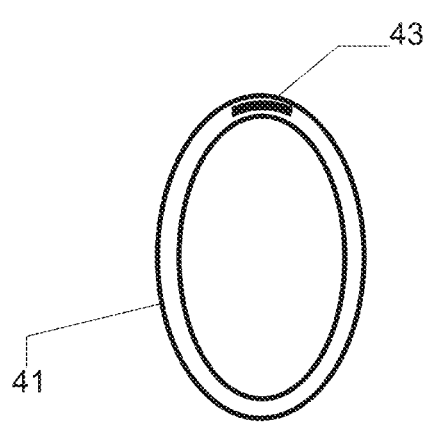
Figure 45a
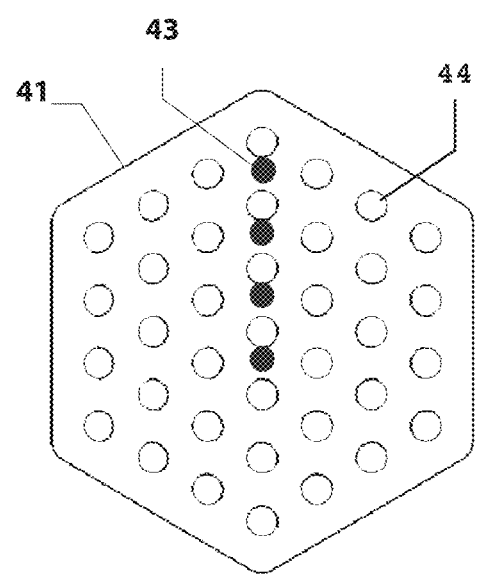
Figure 45d
Figure 45c

COMPOSITE MATERIAL

FIELD

This invention relates to composite materials for garments. Particularly, puncture, cut, and abrasion resistant composite materials.

BACKGROUND

Australian patent application no. 2006340789 discloses a puncture and cut resistant material for use in wetsuits. The material therein disclosed employs a plurality of individual protective plates attached at single points to an elastic base layer.

There are a number of disadvantages to known puncture and cut resistant materials such as the one disclosed in AU 2006340789. Those composite materials using a point-attachment of protective plates (platelets), like AU 2006340789, provide a composite material that is elastic. However, the protective plate can twist on the axis of the attaching point. This can result in a protective plate rotating out of alignment with other like adjacent protective plates. Further, protective plates located in areas of movement in a wetsuit, such as knees and elbows, can lift if they are only attached at a single point. This is particularly severe if the single point is not at the centre of the protective plate.

Also, as disclosed in AU 2006340789, a single point of attachment to a single layer of connective material can be a relatively fragile connection, prone to failure, and lacking redundancy.

Further, composite materials using rigid flat protective plates can have difficulty conforming to curved objects underneath, such as a human body. This is pronounced in smaller diameter curves such as wrists or ankles. The lack of conformity to a 3D curved object can cause the protective plates to overlap excessively, or extend away from a curved underlying shape if said plates are flat.

Composite materials employing rigid protective plates that are not designed to conform to one another can yield a cross section of material that is excessively thick and cumbersome. This excessive thickness is undesirable for garments, especially in areas prone to rubbing or chafing, such as in the underarm and groin regions. Further, plates that do not conform to the shape of other plates can create significant excessive thickness when the plate is bent inward or outward. This occurs in garments at knee and elbow areas.

Composite materials that do not utilize overlapping arrangements of protective plates, such as using a side-by-side arrangement of protective elements, are vulnerable at the joints, requiring multiple layers of side-by-side arrangements of protective plates to overcome. This can create significant manufacturing challenges, as well as costly and heavy redundant layering. Also, multiple layers of rigid protective plates can be limited in bending and flexing, for example when covering elbows and knees.

Further, in a side-by-side arrangement of protective plates, the protective plate perimeter edges may bind on one another in compression. Compression may occur in any number of areas or situations, such as at the back of knees and/or the inside joint of elbows when the composite material is used for a garment. Edge binding of adjacent protective plates is extremely undesirable at joints in garments.

Composite materials that allow for expansion, but which do not limit the total expansion, can face issues of unprotected areas as the overlaps are exceeded and gaps are exposed between protective plates.

A further issue with point-attachment of the protective plates to the elastic base layer is a lack of connection to the optional cover layer. A cover layer is disclosed in AU 2006340789, however, this cover layer is prone to lifting from the base layer and the protective plates when water is draining from the wetsuit, which can be pronounced at the wrists, the torso, and/or at the ankles.

Protective plates, which in and of themselves are not buoyant, may create a garment that lacks buoyancy to a desired level, which decreases utility of the garment.

OBJECT OF THE INVENTION

It is an object of the present invention to at least substantially address one or more of the above disadvantages or at least provide a useful alternative to the composite materials discussed above.

SUMMARY OF INVENTION

In a first aspect the present invention provides a composite material comprising:
  a base layer;
  a plurality of protective plates located on the base layer;
  an attaching means to connect the base layer to the protective plates, wherein the attaching means is positioned along a first direction on the base layer to resist pivoting of each protective plate about an axis normal to the base layer.

Preferably, a surface area of the attaching means is substantially less than a surface area of the protective plate.

Preferably, the attaching means includes a plurality of connections positioned along the first direction.

Preferably, the attaching means includes an elongate line along the first direction.

Preferably, the composite material comprises a second attaching means connecting the base layer to the protective plates, wherein the second attaching means is positioned along a second direction on the base layer, the second direction being non-parallel to the first direction.

Preferably, the composite material further comprises a cover layer atop the protective plates.

Preferably, the composite material further comprises a third attaching means connecting at least one of the protective plates to the cover layer.

Preferably, the third attaching means is positioned along a third direction on the cover layer to resist pivoting of the protective plate about an axis normal to the cover layer.

Preferably, the composite material comprises a fourth attaching means connecting at least one of the protective plates to the cover layer, wherein the fourth attaching means is positioned along a fourth direction on the cover layer, the fourth direction being non-parallel to the third direction.

Preferably, the first and third direction are parallel, and the second and fourth direction are parallel.

Preferably, the third and fourth attaching means are located between the plurality of protective plates and the cover layer.

Preferably, the attaching means include a thermosetting polymer.

Preferably, the attaching means include rivets.

Preferably, the base layer is formed from neoprene.

Preferably, the base layer is formed from an elastic cut resistant material.

Preferably, the base layer is discontinuous.

Preferably, each protective plate has a leading portion and a trailing portion, wherein the leading portion of each protective plate is shaped to conform to the trailing portion of a like protective plate and the attaching means is located at one of the leading portion and the trailing portion.

Preferably, each protective plate has a first and a second lateral portion, wherein the first lateral portion of each protective plate is shaped to conform to the second lateral portion of a like protective plate.

Preferably, the leading portion, the trailing portion, the first lateral portion and the second lateral portion are tapered such that, when the respective portions conform the composite material has a substantially constant thickness.

Preferably, the base layer includes a plurality of moulded recesses and each protective plate is located in a recess.

Preferably, the protective plates include one or more channels and/or ribs on an upper surface of the protective plates.

Preferably, the protective plates have a honeycomb structure on an upper surface of the protective plates.

Preferably, the protective plates have a frame.

Preferably, the protective plates have an irregular surface.

Preferably, the protective plates are formed in the shape of a void shape.

Preferably, the protective plates are arranged as a plurality of groups of concentric rings.

Preferably, the protective plates are infused with a bonding agent.

Preferably, the bonding agent cures into a flexible solid.

Preferably, the infusion of the bonding agent leaves one or more gaps in the protective plate.

Preferably, the gap acts as a living hinge.

Preferably, the protective plates include a top layer, a middle layer and a stiff layer.

Preferably, the middle layer is a bonding layer.

Preferably, the stiff layer is resistant to rolling and/or folding.

Preferably, the top layer is substantially softer than the middle layer and the stiff layer.

Preferably, the middle layer is softer than the stiff layer, but harder than the top layer.

Preferably, the middle layer includes an irregular surface substantially matching the edge surface of a threat.

Preferably, the protective plates are coated in an encapsulation material that is resistant to rolling and/or folding.

Preferably, each protective plate includes one or more perforations.

Preferably, the one or more perforations have a V-like shape.

Preferably, one or more perforations are located at least on both a leading portion and on a trailing portion of each protective plate, and the perforation on the leading portion is a different size compared to the perforation on the trailing portion, such that when the leading portion of the protective plate and the trailing portion of a like protective plate overlap, the V-like shape of each perforation aligns with the other.

Preferably, the one or more perforations are filled with a buoyant material.

Preferably, the one or more perforations are covered by a waterproof layer such that the perforations are not filled with water when the composite material is submersed.

Preferably, each protective plate overlaps a like adjacent protective plate, and each protective plate is adapted to resist a movement relative to the like adjacent protective plate that would result in the protective plate not overlapping the like adjacent protective plate.

Preferably, each protective plate is adapted to resist the movement by being linked to the like adjacent protective plate.

Preferably, each protective plate is adapted to resist the movement using a first catch on a leading edge of the protective plate and a second catch on a trailing edge of the like adjacent plate.

Preferably, each protective plate is adapted to resist the movement by being mounted on a limitedly elastic layer.

Preferably, each protective plate comprises:
a carrier layer; and
at least one protective element.

Preferably, the carrier layer is formed from a buoyant material.

Preferably, the carrier layer is flexible and wherein the protective element includes a plurality of rigid plates bonded to the carrier layer.

Preferably, the rigid plates are formed in a ring shape.

Preferably, the plurality of rigid plates form a two-dimensional array.

Preferably, each two-dimensional array is connected to a like adjacent two-dimensional array at the respective adjacent corners using an elastic link.

Preferably, the carrier layer includes flexible hinge portions between the rigid plates.

Preferably, the flexible hinge portion is a living hinge.

Preferably, the flexible hinge portion is a link.

Preferably, each protective plate comprises:
at least two protective platelets; and
at least one flexible connection from one said protective platelet to another, wherein the array of said linked platelets form a shape substantially larger than an individual platelet.

In a second aspect, the present invention provides a composite material comprising:
a base layer;
a plurality of protective void shapes which do not directly engage one another;
an attaching means to connect the base layer to the protective plates, wherein the surface area of the attaching means is substantially less than a surface area of the protective plate.

Preferably, the void shapes overlap one another.

In a third aspect, the present invention provides a protective platelet comprising:
at least two protective plates;
a flexible means to connect said plates; wherein
the surface area of the connected said plates forms a shape with an area substantially larger than the individual said plates.

Preferably, the flexible means to connect plates is in the form of a flexible material under the plates, with each plate connected to the said base material such that flexibility remains at the adjacency of said plates.

Preferably, the plates are flexibly connected directly to adjacent plates.

Preferably, the protective platelets are formed from bonding a flexible base material with a binding agent at least partially discontinuously, forming bonded area shapes and leaving voids between adjacent bonded area shapes to create living hinges.

In a fourth aspect, the present invention provides a protective platelet comprising:
a protective plate;

an outward facing surface of the plate which engages an imposed threat object; wherein said threat object is impeded when traversing across the surface of said plate.

Preferably, the outward surface of the plate utilizes voids with a "V" shape when viewed in section.

Preferably, the outward surface of the plate utilizes linear slots which overlap one another such that an imposed threat object will encounter a slot when traversing in a line across the surface of the plate.

Preferably, the outward surface of the plate has a roughened surface to impede a threat object from traversing across it's outward surface.

Preferably, the roughened outward surface of the plate is covered by a sacrificial material which creates a smooth outer surface on top of the roughened surface.

Preferably, the outward surface of the plate is a softer layer of material covering a harder layer underneath.

Preferably, the platelet assembly is buoyant.

Preferably, the shape ratio is similar to a body part it covers, about 1:2 of circumference:length.

In a fourth aspect, the present invention provides a garment at least partially constructed from the composite material of the first, second, or third aspect.

Preferably, the protective plates in two or more locations on the garment have dissimilar sizes.

Preferably, the protective plates in two or more locations on the garment have dissimilar shapes.

Preferably, the protective plates in two or more locations on the garment have attachment means in a dissimilar first direction.

Preferably, the shape of each protective plate is adapted to conform, in use, to the shape of a user of the garment and each protective plate has an aspect ratio of a circumference of the shape and a length of the shape of about 1:2.

Preferably, the protective plates are comprised of a flexible high strength material, combined (infused, encapsulated, bonded to, etc.) with a bonding agent.

Preferably, the flexible high strength material infused with the bonding agent leaves one or more gaps in the bonding agent to allow more flexible areas in the protective plate.

Preferably, the protective plates include a top layer, a middle layer and a less flexible (or stiffer) layer.

Preferably, the less flexible (or stiffer) layer is resistant to rolling and/or folding.

Preferably, each protective plate overlaps a like adjacent protective plate, and each protective plate is adapted to resist a gapping movement relative to the like adjacent protective plate that would result in the protective plate not overlapping the like adjacent protective plate.

Preferably, each protective plate is adapted to resist the gapping movement by being linked to the like adjacent protective plate.

Preferably, each protective plate is adapted to resist the gapping movement using a first catch on a leading edge of the protective plate and a second catch on a trailing edge of the like adjacent plate.

Preferably, the protective platelet features a turned up perimeter on at least one side which conforms to adjacent platelets.

Preferably, the protective platelet features a turned up perimeter on at least one side which prevents a point from slipping off the edge Preferably, the platelets are attached in a side by side arrangement, with intermittent elastic attachment elements Preferably, the platelets are attached via a substantial corner to corner attachment, such that the flexible platelet is substantially outstretched Preferably, the base layer or the cover layer is a net or web material.

Preferably, the base material conforms to the shape of the platelets

Preferably, the irregular surface on the protective platelet is achieved by warping or pending the material to create raised and lowered edges.

Preferably, the irregular surface is comprised of slotted areas which may be discontinuous.

Preferably, the protective platelet is comprised of perimeter shape elements in smaller and smaller dimensions, in a nested configuration each individually connected to a base layer.

Preferably, the high strength material is kept substantially elongated by longitudinal elements along one or more axis (similar to poles on a kite).

Preferably, the high strength material is kept substantially elongated by a perimeter outstretching element.

Preferably, the cover layer or base layer is created by discontinuous elements, attached to two or more platelets to connect them into an array.

Preferably, the platelets overlap will be at substantially the vertical center axis line and substantially the horizontal axis line.

Preferably, attachment to the cover layer will be at a substantially opposing side from the attachment to the base layer.

Preferably, the axis of attachment to a cover layer will be perpendicular to the attachment to the base layer where covering a substantially flat area.

Preferably, the axis of attachment to a cover layer will be parallel to the attachment to the base layer where covering an elongated area (such as an arm).

Preferably, the platelet shape has a longer dimension oriented along a flatter plane, and a shorter dimension oriented along a curved plane, such as along a forearm.

Preferably, a platelet has a curve along substantially one axis.

Preferably, a platelet has a curve along substantially two axis.

Preferably, a platelet has custom shaped perforations to best fit the overall shape and also maintain edge thickness of material along the perimeter edge.

Preferably, a platelet has perforations, irregularities, slots, or deformations arranged such that a point traveling along the platelets surface in a straight line will encounter one said perforation, irregularity, slot, or deformation.

Preferably, platelets are infused with a bonding agent that when cured resists rolling or folding.

Preferably, platelets are bonded to a flexible material that resists rolling or folding.

Preferably, a platelets high strength material can be intermittently infused with a bonding material, such that there are gaps between the bonding material to allow greater flexibility in the gaps similar to a living hinge.

Preferably, a platelet can be comprised of a high strength flexible material with a plurality of high strength less flexible elements bonded to the high strength material in an arrangement to leave gaps between the less flexible elements, to allow greater flexibility in the gaps similar to a living hinge.

BRIEF DESCRIPTION OF DRAWINGS

Preferred embodiments of the present invention will now be described, by way of examples only, with reference to the accompanying drawings:

FIG. 18b is a front view of the protective plate of FIG. 18a.

FIG. 18c is a front section view of the protective plate of FIG. 18a.

FIG. 19a is a perspective top view of the protective plate of FIG. 18a.

FIG. 19b is a perspective bottom view of the protective plate of FIG. 18a.

FIG. 20a is a side elevation view of the protective plate of FIG. 18a.

FIG. 20b is a side section view of the protective plate of FIG. 18a.

FIG. 21a is a top plan view of three protective plates according to FIG. 18a.

FIG. 21b is a front view of the protective plates of FIG. 21a.

FIG. 21c is a front section view of the protective plates of FIG. 21a.

FIG. 22a is a top perspective view of the protective plates of FIG. 21a.

FIG. 22b is a side elevation view of the protective plates of FIG. 21a.

FIG. 22c is a side elevation section view of the protective plates of FIG. 21a.

FIG. 25b is a front view of the protective plate of FIG. 25a.

FIG. 25c is a front section view of the protective plate of FIG. 25a.

FIG. 25d is a side section view of the protective plate of FIG. 25a.

FIG. 26a is a top perspective view of the protective plate of FIG. 25a.

FIG. 26b is a bottom perspective view of the protective plate of FIG. 25a.

FIG. 26c is a side elevation view of the protective plate of FIG. 25a.

FIG. 27a is a top perspective view of three protective plates according to FIG. 25a.

FIG. 27b is a side elevation view of the protective plates of FIG. 27a.

FIG. 28a is a top plan view of a third embodiment of a protective plate used in any embodiment of the composite material and with any embodiment of attachment according to the invention.

FIG. 28b is a front section view of the protective plate of FIG. 28a.

FIG. 29a is a top plan view of a fourth embodiment of a protective plate used in any embodiment of the composite materials and with any embodiment of attachment according to the invention.

FIG. 29b is a front section view of the protective plate of FIG. 29a.

FIG. 30 is a side section view of a fifth embodiment of a protective plate used in any embodiment of the composite material and with any attachment embodiment according to the invention.

FIG. 31a is a top plan view of a sixth embodiment of a protective plate used in any embodiment of the composite material and with any attachment embodiment according to the invention.

FIG. 31b is a side elevation view of the protective plate of FIG. 31a.

FIG. 31c is a front view of the protective plate of FIG. 31a.

FIG. 31d is a top plan view of a seventh embodiment of a protective plate used in any embodiment of the composite material and with any attachment embodiment according to the invention.

FIG. 31e is a side section view of the protective plate of FIG. 31d.

FIG. 31f is a front section view of the protective plate of FIG. 31d.

FIG. 32a is a top plan view of an eighth embodiment of a protective plate used in any embodiment of the composite material and with any attachment embodiment according to the invention.

FIG. 32b is a front section view of the protective plate of FIG. 32a.

FIG. 36b is a schematic side view section of the protective plate of FIG. 36a.

FIG. 41b is a side section view of the protective plate of FIG. 41a.

FIG. 42b is a front section view of the protective plate of FIG. 42a.

FIG. 45a is a bottom plan view of the protective plate of FIG. 18a, showing a first attachment embodiment of a platelet to a layer with an elongate curve in substantially one axis or direction.

FIG. 45b is a bottom plan view of the protective plate of FIG. 31a, showing a second embodiment of attachment as an elongate line in substantially one axis or direction.

FIG. 45c is a bottom plan view of the protective plate of FIG. 31a, showing a third embodiment of attachment as multiple attachment points along substantially one axis or direction.

FIG. 45d is a bottom plan view of the protective plate used in the composite material of FIG. 33a, showing the first embodiment of attachment as a elongate curve on a ring platelet.

DESCRIPTION OF EMBODIMENTS

Figure 1:
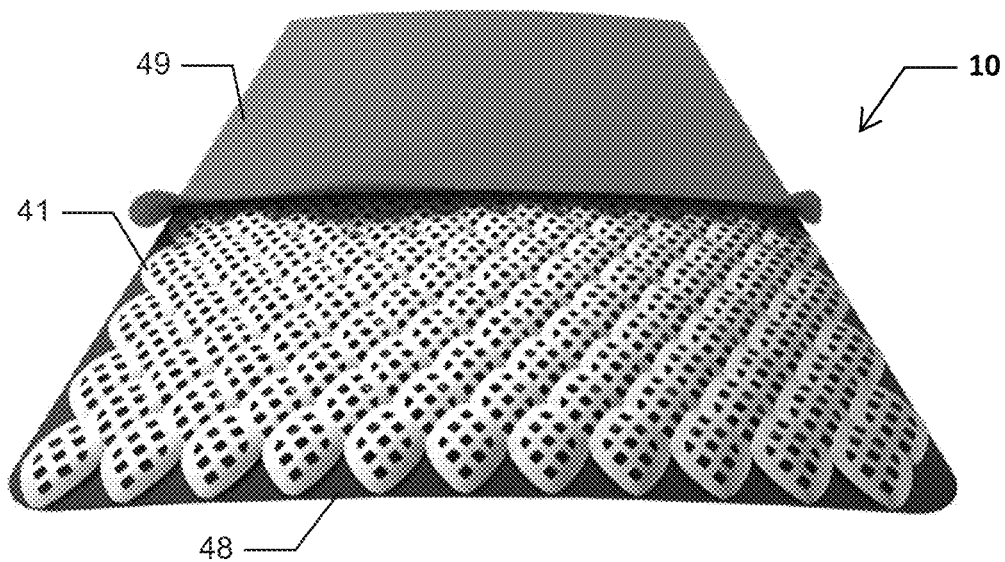
FIG. 1 is a perspective view of a first embodiment of the composite material according to the invention.

To assist with the understanding of this disclosure, an explanation of some of the terms used in this specification is provided below.

"Layer" (such as base and cover, carrier layers etc.) includes materials, fabrics, weaves, knits, laths, screens, threads, webs, nets, elongate elements, sheets, or the like that serve to connect a number of plates, or plate assemblies, and substantially maintain their relative position to one another. Materials may be continuous, or discontinuous, and may be in large planes, or arrays of smaller pieces, or any combination thereof.

"Perforation" includes any opening or void in a protective plate, which may be consistently shaped, custom shaped, tapered, partially indented, or the like.

"Irregular surface" includes recesses, protrusions, channels, slots, indentations, grooves, roughening, corrugations, wrinkles, impressions, soft material, felt, wool, or other means to interrupt a smooth plane, such that objects sliding horizontally across the surface of a protective plate will be interrupted and/or have a higher coefficient of friction to the surface.

"Protective elements" include individual or multiple plates, assemblies or combinations of linked plates, or larger elements of material with voids or living hinge type elements within, in which the larger protective element is flexible and potentially elastic. This includes but is not limited to carrier arrays, linked arrays, and infused arrays. These protective elements can function as individual plates in conjunction with different embodiments of composite materials, and different embodiments of attachment means.

"Protective plate", or "plate," includes cut and/or puncture resistant material, including rigid materials, soft materials, thermosetting plastics, resins, glues, adhesives, rings of all shapes/sizes, frames, fabrics, weaves, knits, chain mail, combinations of fabrics, chain mails, nets, and bonding agents, or combinations of layers, or encapsulation agents, or the like, to create a protective shape.

"Attachment" includes glue, tape, raised protrusions, adhesives, bonding agents, heat fusing, partial embedment to connective materials, mechanical attachments such as rivets, sewing, fasteners, hook/loop, raised protrusions from other materials, links, rings, or the like.

"Frame" or "void shape" materials include rings, hollow shapes, frames, frames with internal partition elements, wires, cables, ropes, extruded materials, punched materials, or the like.

"High strength flexible material" includes clothes, weaves, knits, mesh, mail, felts, wool, braids, nets, webs, or the like.

"Elongate" includes an extended plane in a line, curve, shape, or the like.

"Infuse" includes saturating with liquid, melting, softening, sonic welding, forcing with heat or pressure or both, sprayed in, dipped in, poured in, or the like.

"Encapsulate" includes partial or complete covering of the surface, partial infusing in the surface, spraying, dipping, pouring, or otherwise covering the some or all of the surface area.

"Infused Array" or "Cast Array" includes any types of high strength flexible materials, combined with discontinuous or partially discontinuous combinations with high strength bonding agents, which may cure on, in, or partially in the material. The bonding agents can be hard or soft, and voids can be created by any number of means, in lines, discontinuous lines, pluralities of dots or connections or shapes, etc. Casting may mean spraying, screening, printing, or other means of combining the bonding agent to the high strength material. It may also include further steps to create voids, such as punching, etching, washing, un-curing, stripping, etc. to remove unwanted areas of bonding material.

"Carrier array" includes at least one base layer, and at least two protective elements or plates bonded to, or cast/infused into, the base layer, such that the assembly creates more flexible areas between the protective elements, including but not limited to living hinges, such that the carrier array may optionally be of a larger size, and carry a plurality of protective plates, and be incorporated into any of the composite material embodiments similar to an individual platelet, and be attached by any of the attachment embodiments similar to an individual platelet. The individual plates can be of any size, shape, contour, etc, and may be completely or partially bonded to the base layer. The base layer can be any flexible or elastic material or portions of materials, preferably high strength and preferably flexible over elastic. Preferably, the base layer is formed from neoprene. Alternatively, the base layer is formed from an elastic cut resistant material.

"Linked array" includes at least two protective platelets (of any size, shape, etc.) or protective elements, linked together in a substantially flexible fashion so that the plurality of protective plates or elements will be substantially flexible, and can be incorporated into any of the composite material embodiments similar to an individual platelet, and be attached by any of the attachment embodiments similar to an individual platelet.

"Link" includes hinges, rings, thread, loops, living hinges, flexible material, strands, material portions, etc. to connect two or more plates or platelets together such that the connection remains flexible.

There is herein disclosed, in a first embodiment, a composite material 10 as shown in FIG. 1. The composite material 10 includes a base layer 48, a plurality of protective plates 41 and a cover layer 49. In a second embodiment, shown in FIGS. 3a, 3b, and 4, the composite material 10 may be constructed without the cover layer 49.

Figure 5A:
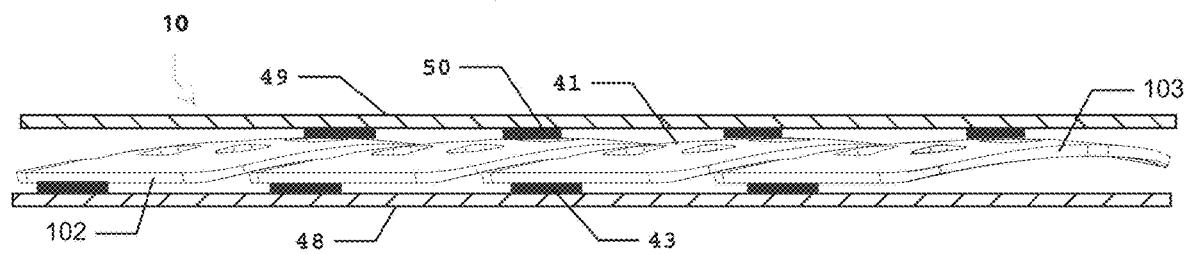
FIG. 5a is a side section view of the composite material of FIG. 1 with regular attachment of the platelets to a cover layer.
Figure 5B:
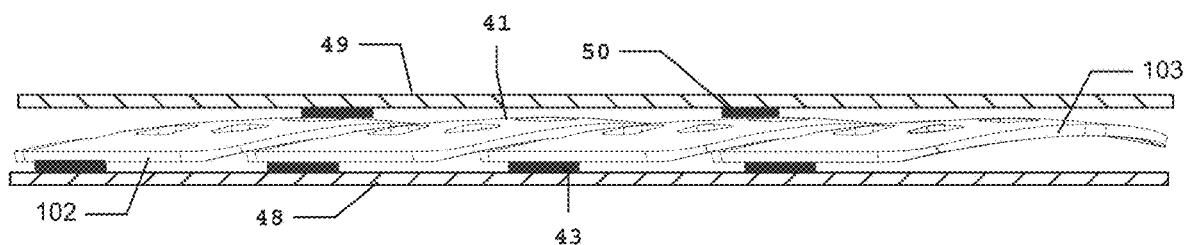
FIG. 5b is a side section view of the composite material of FIG. 1 with an intermittently attached cover layer.

As shown in FIG. 5a, the protective plates 41 are attached to the base layer 48 by at least one base layer attachment 43 which can be any attachment embodiment. The protective plates 41 are attached to the cover layer 49 by at least one cover layer attachment 50, which can also be any attachment embodiment. The base layer attachment 43 of a first protective plate 41 is substantially opposite the cover layer attachment 50 of an adjacent protective plate 41. In the first embodiment, each protective plate 41 is connected to the base layer 48 and the cover layer 49. Optionally and instead, none, or some of the protective plates 41 may be connected to the cover layer 49 as seen in FIG. 5b.

As best seen in FIGS. 18a to 44c, the protective plates 41 may take a number of different, forms, shapes or a plurality of shapes, preferably having a shape ratio of about 1:2 of a circumference of the shape to a length of the shape.

Figure 18A:
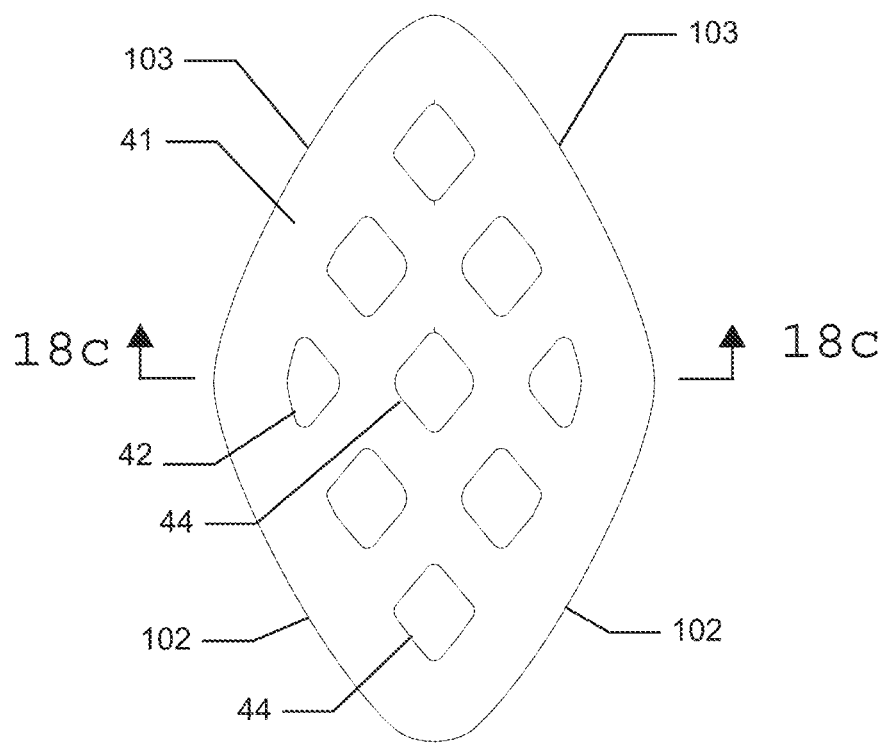
FIG. 18a is a top plan view of a first embodiment of a protective plate used in any embodiment of the composite material, and used with any embodiment of attachment, according to the invention.
Figure 18B:
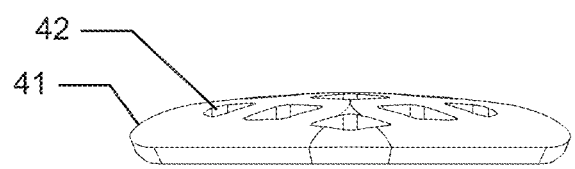
Figure 18C:
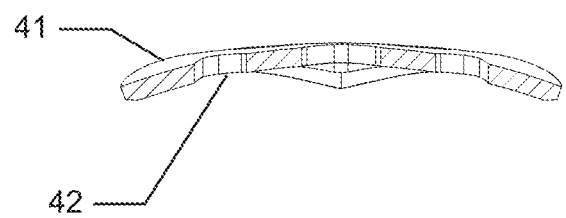
Figure 19A:
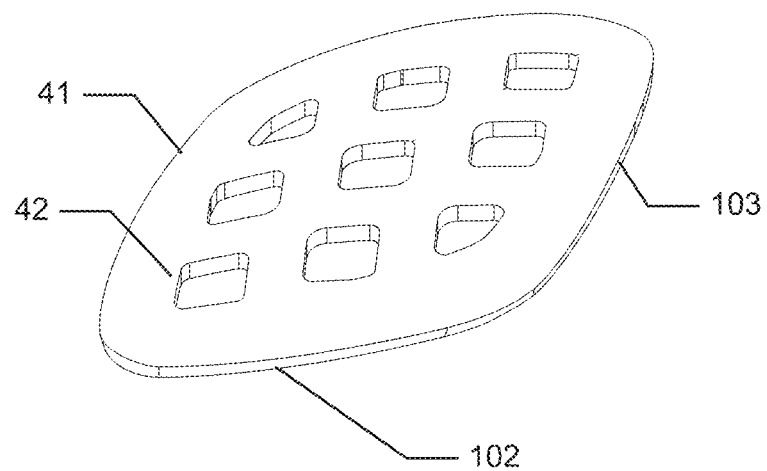
Figure 19B:
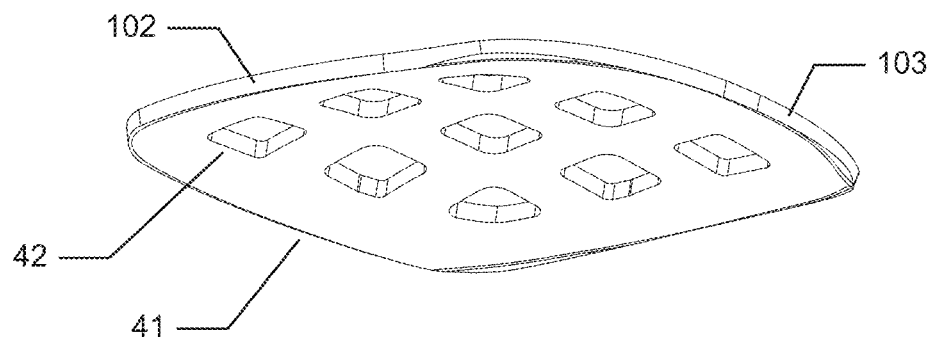

In a first platelet embodiment, as seen in FIG. 18a, the protective plate 41 may have a generally diamond-like shape. The protective plate has perforations custom perforations 42, and standard perforations 44 that are shaped to maximize toughness of the protective plate 41 while decreasing its weight. The perforations 42 are custom shaped to conform to the edge portion of the protective plate 41. The protective plate 41 has a leading edge 102 and a trailing edge 103. As shown in FIG. 18b, the protective plate 41 has a generally rounded upper surface to avoid presenting sharp edges at an exterior of the material.

Figure 20A:
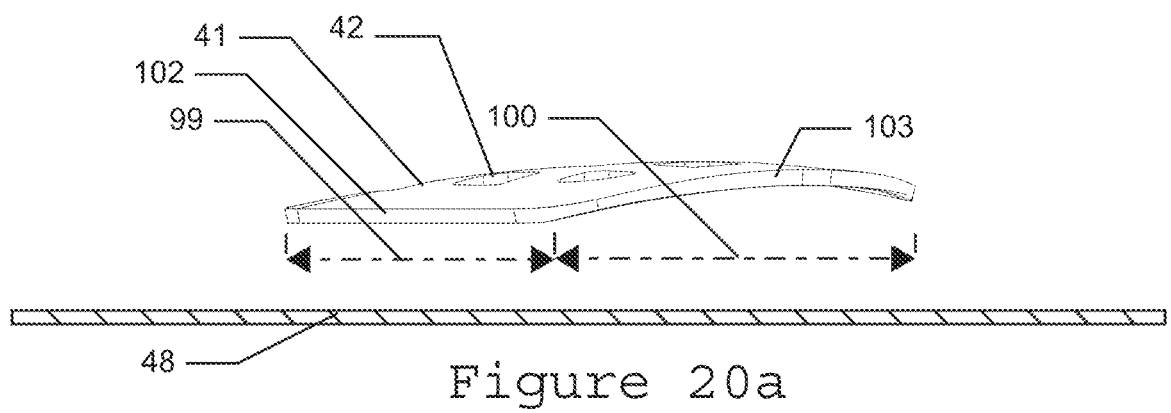
Figure 20B:
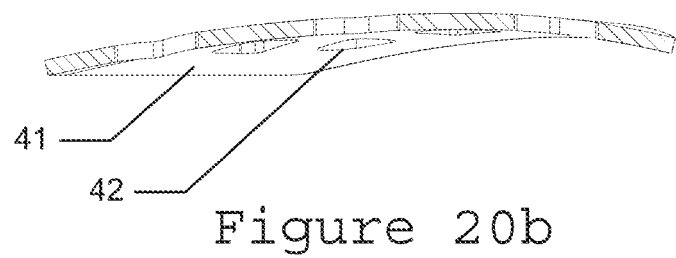
Figure 21A:
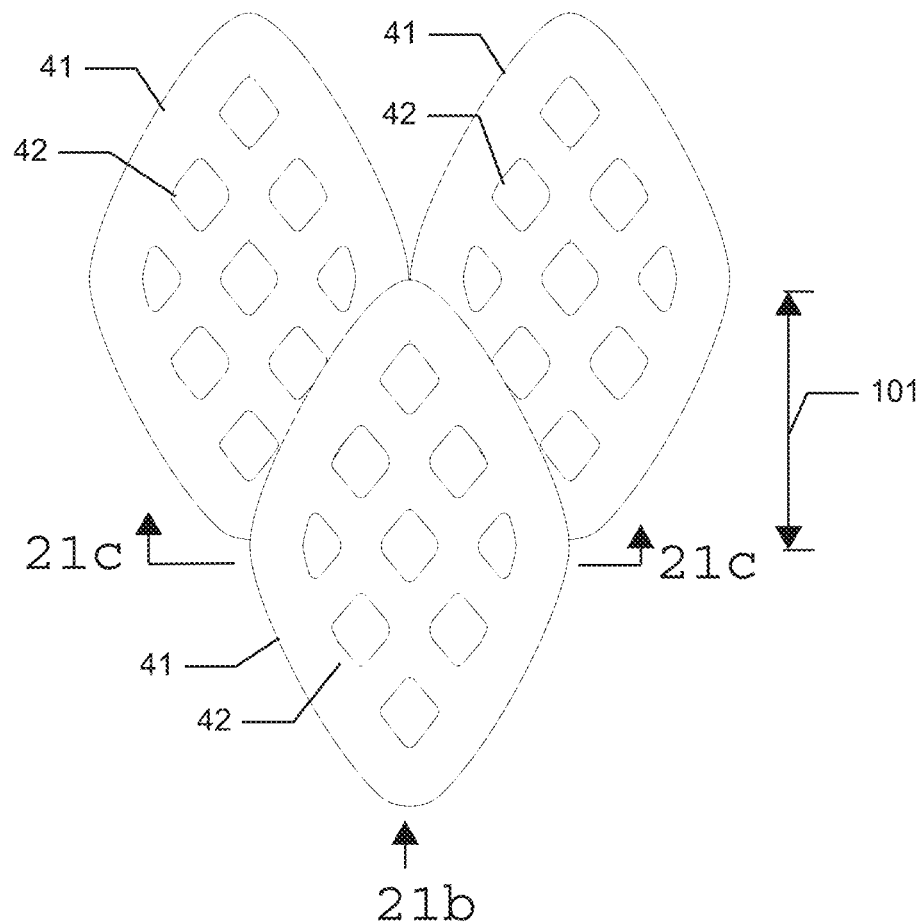
Figure 21B:
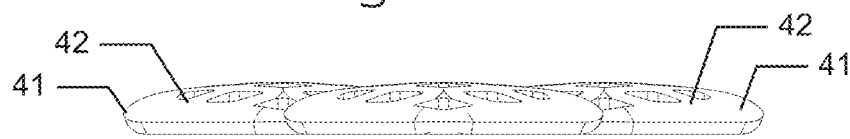
Figure 21C:
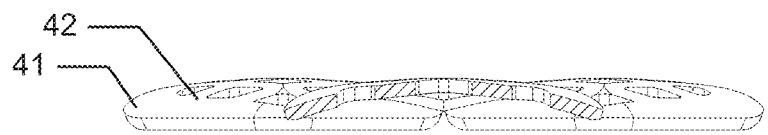
Figure 22A:
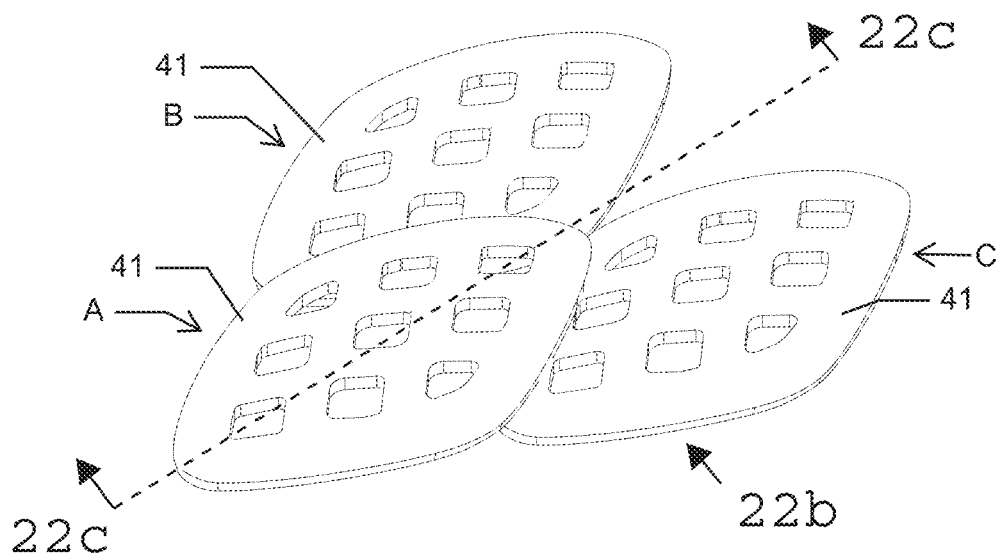
Figure 22B:
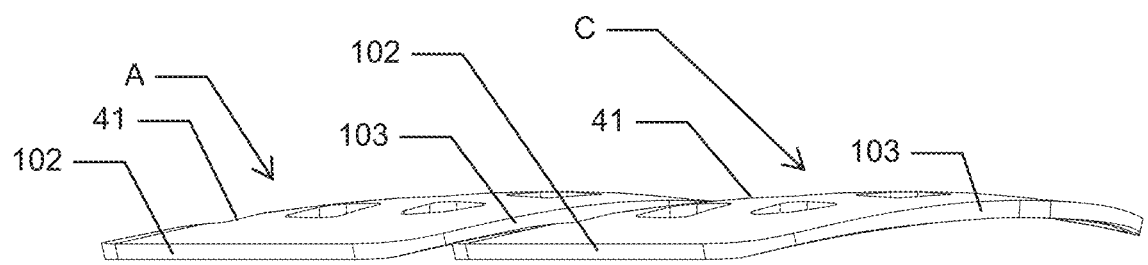
Figure 22C:
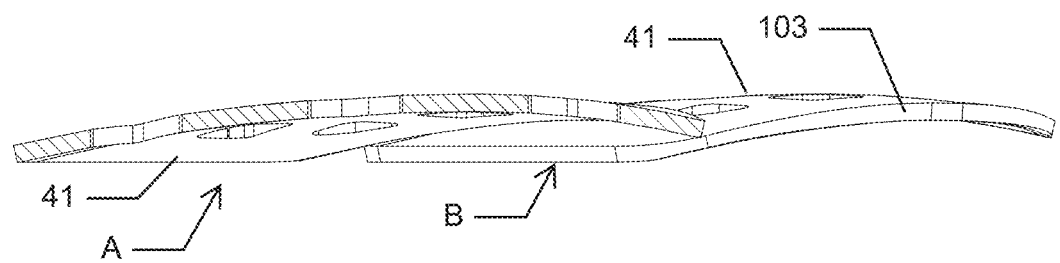

As shown in FIG. 20a, the protective plate 41 has a leading portion 99 and a trailing portion 100. The leading portion 99 has a flat surface area at the perimeter edge suitable for attachment to the base layer 48 using any base layer attachments 43. As shown in FIG. 20b, the trailing portion 100 is substantially raised to allow nesting of the leading portion 99 of a like protective plate 41. This arrangement is illustrated in FIGS. 21a to 22c, using the example of three protective plates 41. The protective plates 41 overlap one another by an area of overlap 101 as seen in FIG. 22a. In FIG. 22b, the protective plates 41 have a substantially constant cross-section in the area of overlap 101. In FIG. 22c the section cutaway reveals the platelet conforming to the one behind.

Figure 23A:
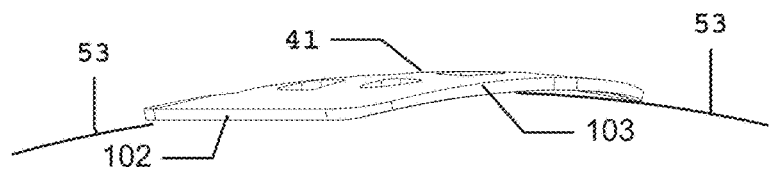
FIG. 23a is a side elevation view of the protective plate of FIG. 18a conforming to a curved surface.
Figure 23B:
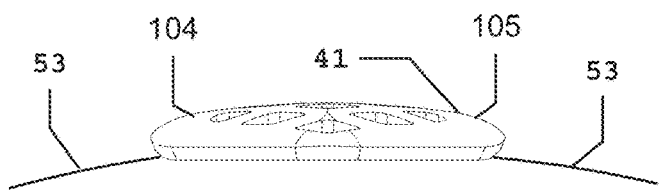
FIG. 23b is a front view of the protective plate of FIG. 18a conforming to a curved surface.
Figure 23C:
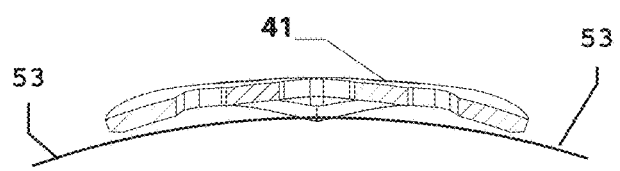
FIG. 23c is a front section view of the protective plate of FIG. 18a conforming to a curved surface.

As seen in FIG. 23b, the protective plate 41 has a first lateral portion 104 and a second lateral portion 105. As shown in FIGS. 23a to 23c, the protective plate 41 may be curved in a direction from the leading edge 102 to the trailing edge 103, as well as, or instead, in a direction from the first lateral portion 104 to the second lateral portion 105 to conform to a curved surface beneath.

FIGS. 25a to 26c show a second embodiment of a protective plate 241. The protective plate 241 has a generally diamond-like shape having a leading edge 202 and a trailing edge 203, similar to the first embodiment of the protective plate 41 according to FIG. 18a. However, in this embodiment the trailing edge 203 is turned up, while the leading edge 202 is not. In FIGS. 26a and 26b the axis lines 118 are shown to clarify the shape of the protective plate 241, only.

Figure 26A:
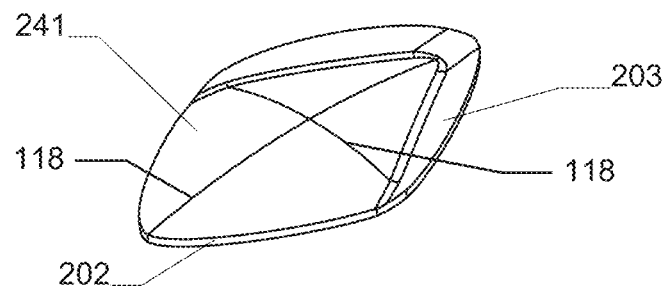
Figure 26B:
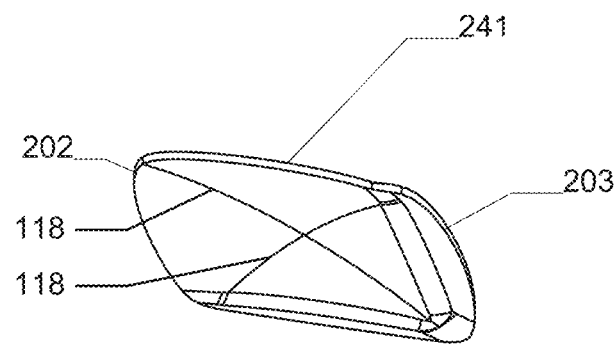
Figure 26C:
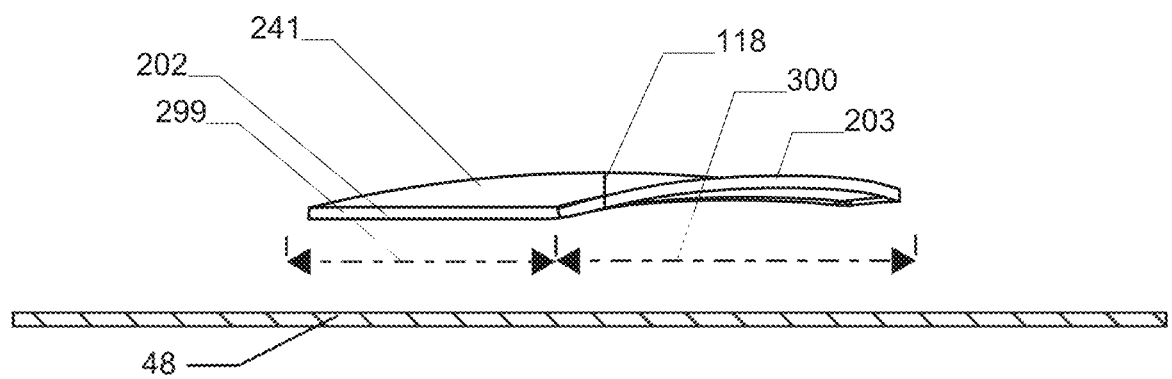
Figure 27A:
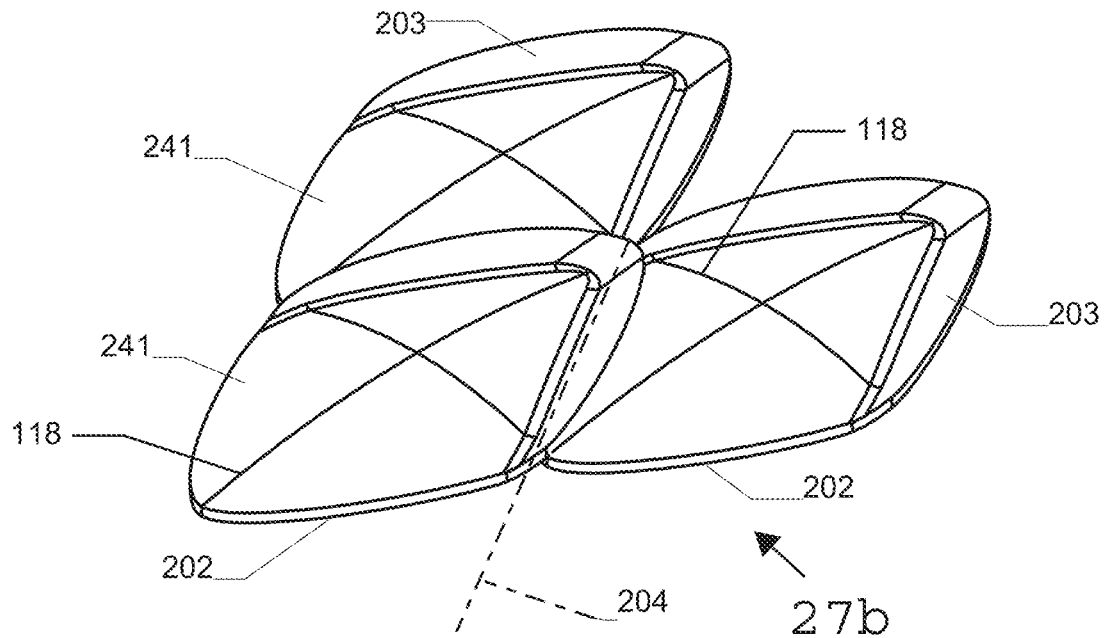
Figure 27B:
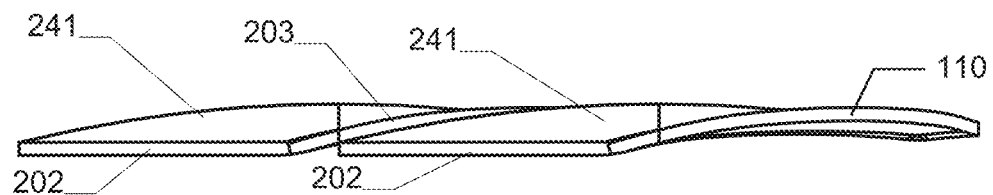

Similarly to the first embodiment, the leading portion 299 of the protective plate 241 is substantially flat along the leading perimeter edge to allow for attachment to the base layer 48, as shown in FIG. 26c. The trailing portion 300 is substantially raised to allow nesting of a like protective plate 241. The turned up trailing edge 203 overlaps the leading edges 202 of adjacent like protective plates 241, as best seen in FIG. 27a. FIG. 27a also shows an area of lateral overlap 204 between the first protective plate 241 and adjacent like protective plates 241.

Further alternative embodiments of the protective plate 41 are shown in FIGS. 28a to 33b and FIGS. 36a to 44c.

FIGS. 28a and 28b show a third embodiment of a protective plate 341 having a frame 332 that creates a number of voids 333.

FIGS. 29a and 29b show a fourth embodiment of a protective plate 441 having a plurality of raised portion 434 and a plurality of lowered portions 435 creating an irregular surface 436. In any plane across the surface of the platelet 2010 a pointed threat will encounter these raised portions, which form void shapes, or concentric rings, as shown in FIG. 29a, and which are seen in section in FIG. 29b.

FIG. 30 shows a fifth embodiment of a protective plate 541. FIG. 30 shows three protective plates 541 attached to the base layer 48 using base layer attachments 43. The leading portion 599 and trailing portion 600 may be of a smaller thickness than the remainder of the protective plate 541. In this manner, the leading portion 599 of one protective plate 541 may underlie the trailing portion 600 of another protective plate 541 while the composite material 10 maintains a substantially constant thickness.

FIGS. 31a to 31c show a sixth embodiment of a protective plate 641. The protective plate 641 has a substantially hexagon-like shape and a number of perforations 44 arranged in an expanding hexagonal grid. The protective plate 641 is curved in a first direction from a first lateral portion 604 to a second lateral portion 605. The protective plate has a material thickness 681. However, due to the curvature, FIG. 31c also shows an overall protective plate thickness 682.

As best seen in FIGS. 31d to 31f, the protective plate 741 may further be curved in a second direction from a leading portion 702 to a trailing portion 703. This is a seventh embodiment of a protective plate 741.

FIGS. 32a and 32b show an eighth embodiment of a protective plate 841. The protective plate 841 has a substantially diamond-like shape with discontinuous slots 844 that substantially follow the perimeter of the protective plate 841 at various distance from the center of the protective plate 841, creating an irregular surface. As shown in FIG. 32b, the protective plate 841 is also curved in two directions. The slots 844 are arranged so that any straight plane across the platelet 2010 will encounter a slot, thus serving to trap the point of a threat which is sliding across the face of the platelet 841.

Figure 33A:
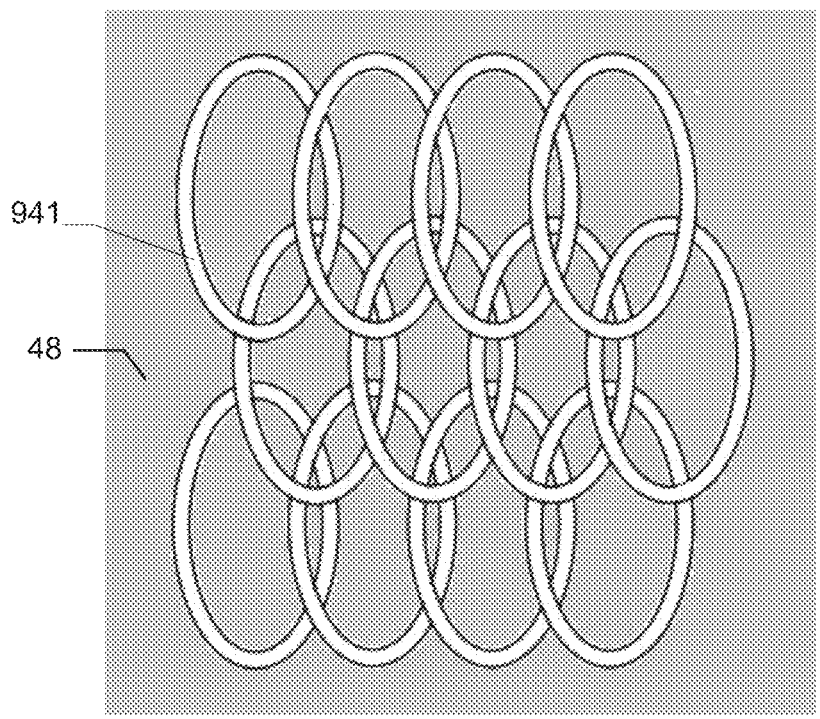
FIG. 33a is a schematic top plan view of a ninth embodiment of twelve protective plates used in any embodiment of the composite material and with any attachment embodiment according to the invention.
Figure 33B:
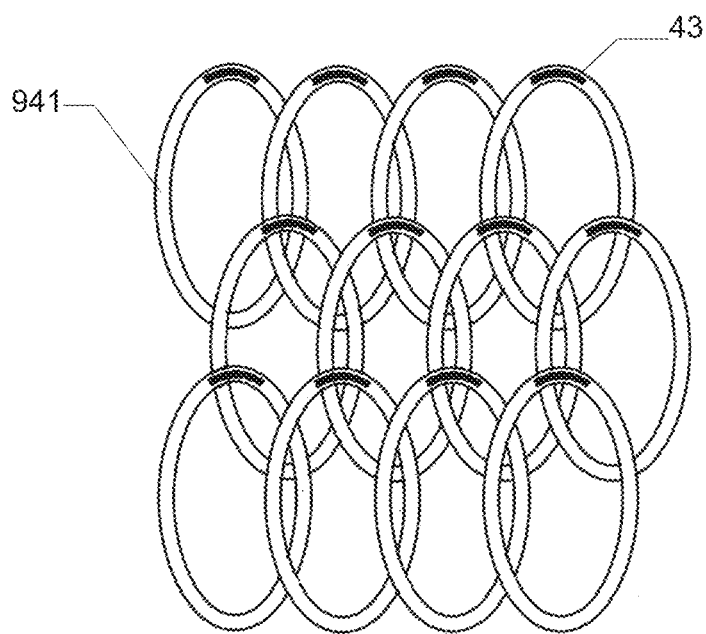
FIG. 33b is a schematic bottom plan view of the protective plate of a ring embodiment of FIG. 33a, showing points of attachment.

FIGS. 33a and 33b show a ninth embodiment of a protective plate 941. The protective plate 941 is in the shape of a void shape, or a ring, attached to the base layer 48 using the base layer attachments 43. In contrast to known chain mail, the protective plates 941 are not interconnected, however the protective plates 941 may be connected to one another using a connection means (not shown) such as nets, webs, strands or the like that are continuous or discontinuous. Throughout the description the terms void shape and ring are used interchangeably.

Figure 36A:
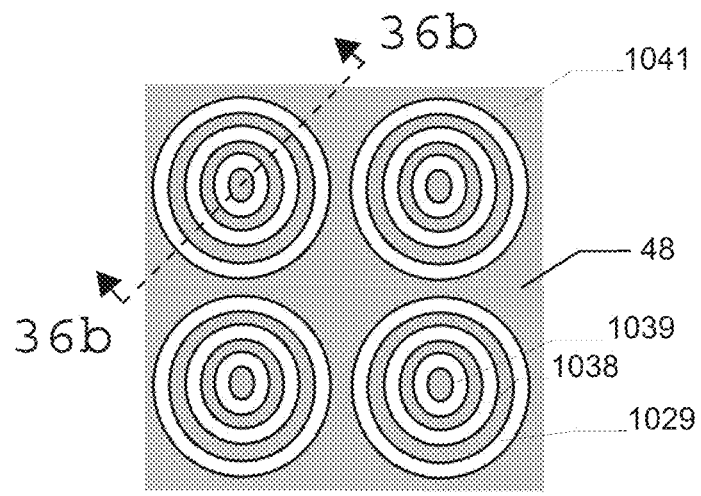
FIG. 36a is a top plan view of a tenth embodiment of a protective plate with nested ring elements, used in any embodiment of the composite material and with any attachment embodiment according to the invention.
Figure 36B:
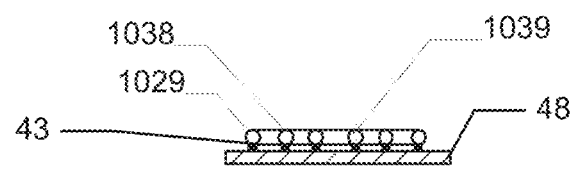
Figure 36C:
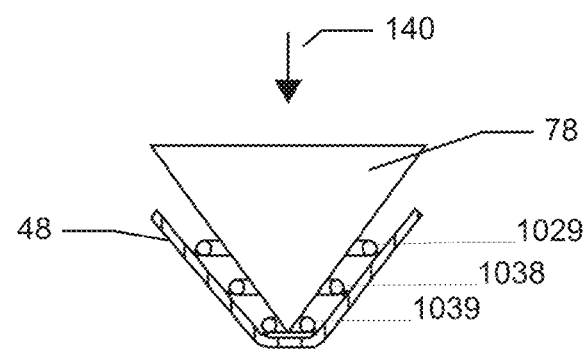
FIG. 36c is a schematic side view section of the protective plate of FIG. 36a engaging a pointed cutting edge.

FIGS. 36a to 36c show a tenth embodiment of a protective plate 1041. The protective plate 1041 includes a first, second and third ring 1029, 1038, 1039. The first ring 1029 is larger than the second and third ring 1038, 1039. The second ring 1038 is smaller than the first ring 2019 but larger than the third ring 1039. The third ring 1039 is smaller than both the first and second ring 1029, 1038. The rings 1029, 1038, 1039 are arranged concentrically on the base layer 48, and essentially nest inside one another.

Figure 37A:
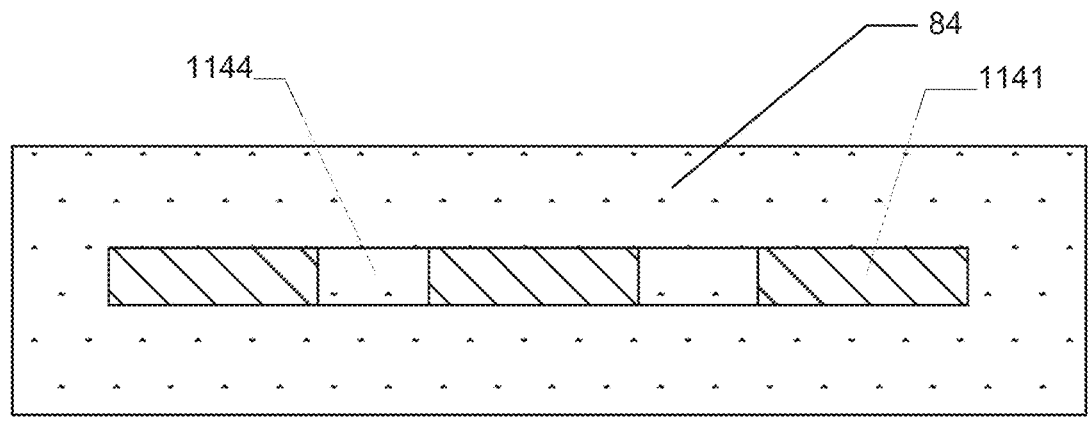
FIG. 37a is a schematic side section view of a protective plate used in any embodiment of the composite material according to the invention, submersed in water.
Figure 37B:
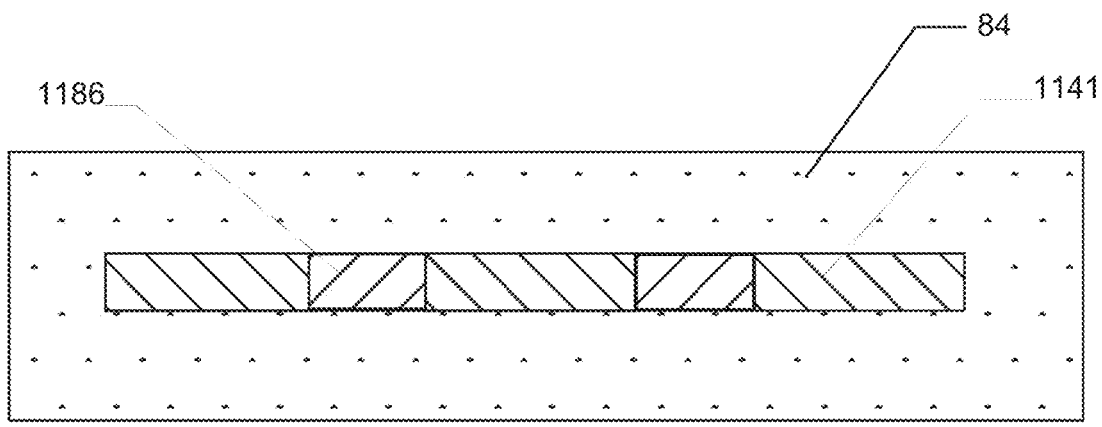
FIG. 37b is a schematic side section view of the protective plate of FIG. 37a, the perforations being filled with a buoyant material, submersed in water.
Figure 37C:
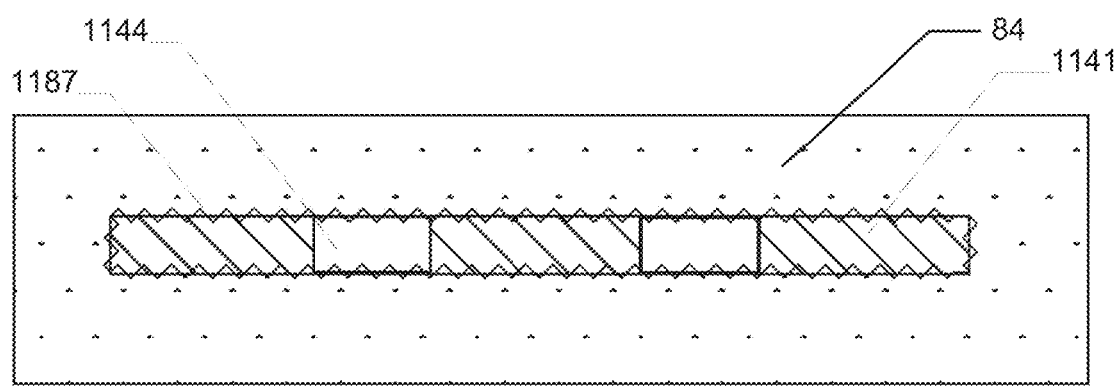
FIG. 37c is a schematic side section view of the protective plate of FIG. 37a, the perforations being encapsulated, submersed in water.

FIGS. 37a to 37c show an eleventh embodiment of a protective plate 1141 submerged in water 84. In this embodiment the perforations 1144 are filled with a buoyant material 1186. Alternatively, the protective plate 1141 has a waterproof encapsulation or surface 1187 that seals the perforations 1144, thus "filling" the perforations with buoyant air and preventing water 84 from filling those voids.

Figure 38A:
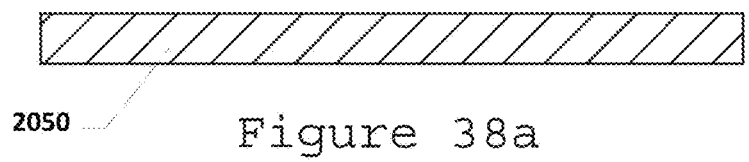
FIG. 38a is a side section view the base material of a twelfth embodiment of a protective plate used in any embodiment of the composite material and any embodiment of attachment according to the invention.
Figure 38B:
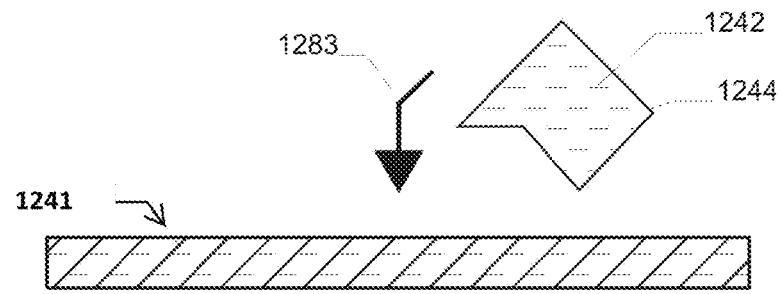
FIG. 38b is a side section view of the twelfth embodiment of a protective plate of FIG. 38a being infused with a flexible bonding agent.
Figure 38C:
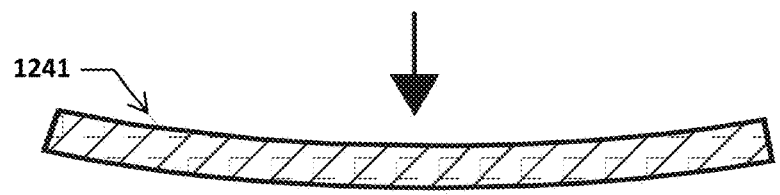
FIG. 38c is a side section view of the protective plate of FIG. 38b being bent under force.

FIGS. 38a to 38c show a twelfth embodiment of a protective plate 1241. The protective plate 1241 is preferably formed of a high strength flexible material 2050 as a base shown in FIG. 38a. The protective plate base 2050 is then infused with a bonding agent 1242, previously held in a container 1244, by means of infusion 1283, such that the resulting protective plate 1241 is a hybrid of both the high strength material and the bonding agent. Selecting the viscosity of the bonding agent 1242 allows control of the level of intrusion of the bonding agent 1242 into the protective plate 1241. It is preferable that the bonding agent cures to a flexible state, which allows the platelet 1241 to deform under force as shown in FIG. 38c. The bonding agent also serves to prevent the hybrid platelet 1241 from folding or rolling at the edges.

Figure 38D:
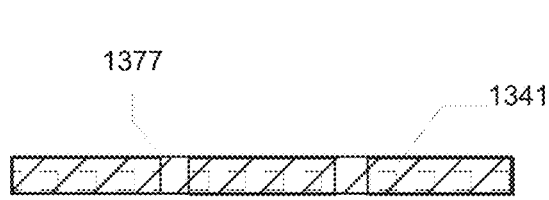
FIG. 38d is a side section view of a thirteenth embodiment of a protective plate used in any embodiment of the composite material and any embodiment of attachment according to the invention.
Figure 38E:
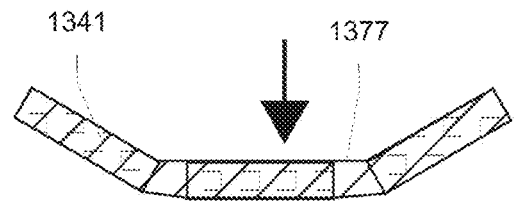
FIG. 38e is a side section view of the protective plate according to FIG. 38d, reacting to a downward force.
Figure 38F:
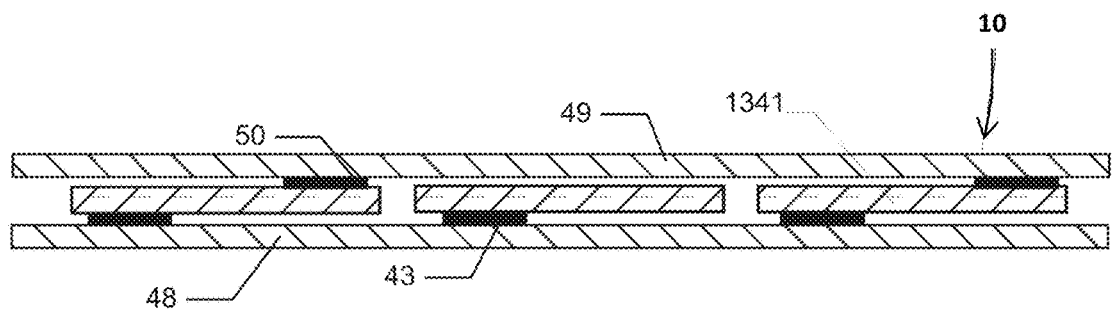
FIG. 38f is a side section view of the protective plate according to FIG. 38c, used in an embodiment of the composite material and any embodiment of attachment according to the invention.

FIGS. 38d to 38f show a thirteenth embodiment of a protective plate 1341. The protective plate 1341 is infused with a bonding agent 1342. However, the protective plate 1341 is infused with bonding agent 1342 such that voids 1377 are created. The voids 1377 act as living hinges, therefore the bonding agent 1342 does not require flexibility. FIG. 38f shows the protective plates 1341 used in a composite material 10.

Figure 39A:
FIG. 39a is a side section view of the base of a fourteenth embodiment of a protective plate used in any embodiment of the composite material and any embodiment of attachment according to the invention.
Figure 39B:
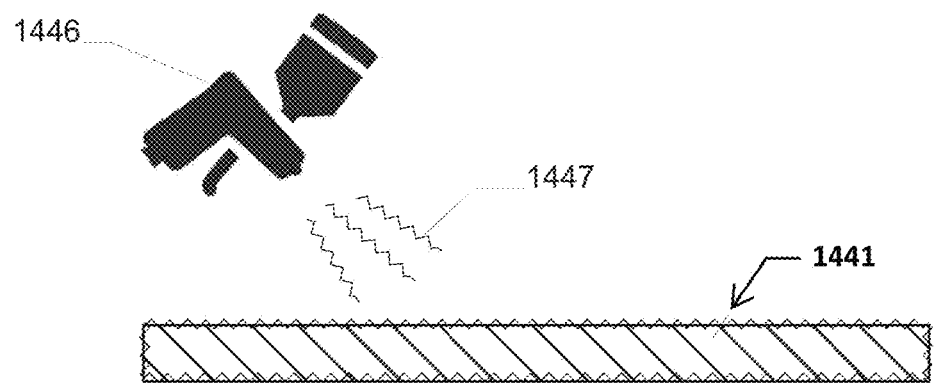
FIG. 39b is a side section view of the fourteenth embodiment of the protective plate of FIG. 39a being encapsulated with a flexible bonding agent.
Figure 39C:
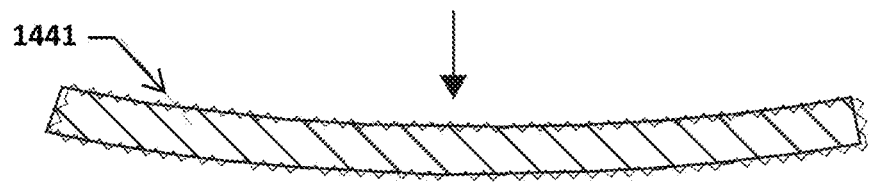
FIG. 39c is a side section view of the protective plate of FIG. 39b being bent under force.

FIGS. 39a to 39c show a fourteenth embodiment of a protective plate 1441. The protective plate base material base 2050 is coated in an encapsulation material 1447 using encapsulation means 1446 making it resistant to folding and/or rolling at the edges. The encapsulation may also serve to make the platelet more buoyant by trapping air in the cross section of the platelet when submerged under water.

Figure 40A:
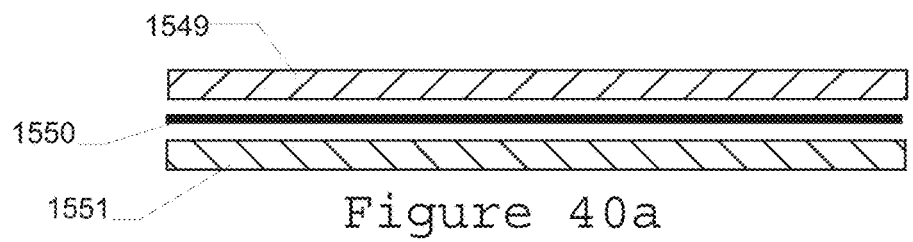
FIG. 40a is an expanded side section view of a fifteenth embodiment of a protective plate used in any embodiment of the composite material and any embodiment of attachment according to the invention.
Figure 40B:
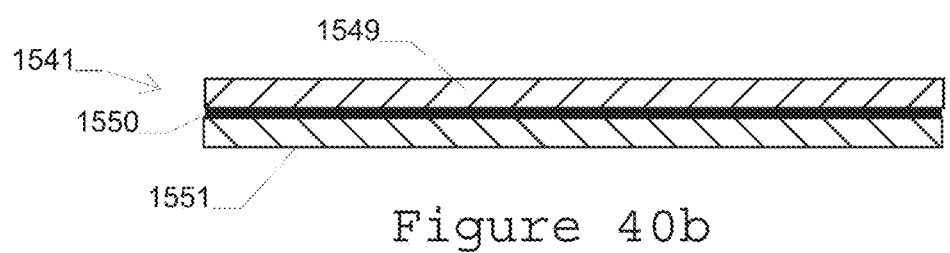
FIG. 40b is a side section view of the protective plate of FIG. 40a in a non-expanded state.
Figure 40C:
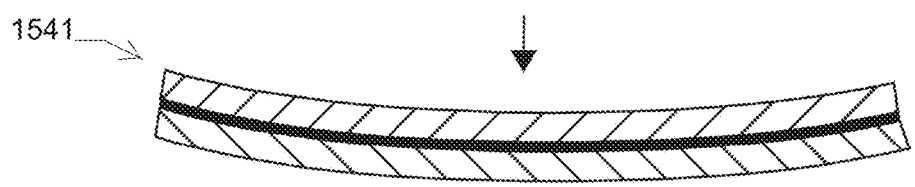
FIG. 40c is a side section view of the protective plate of FIG. 40 bent under a force.
Figure 40D:
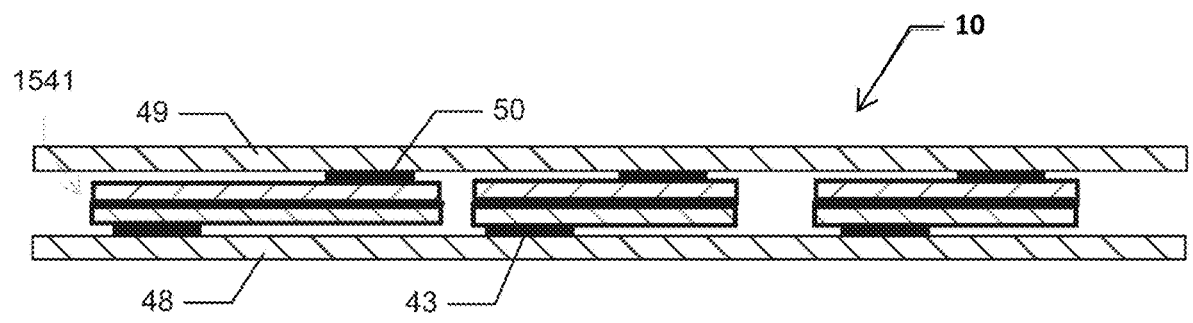
FIG. 40d is a side section view of the protective plate of FIG. 40 used in the first embodiment of the composite material and any embodiment of attachment according to the invention.

FIGS. 40a to 40d show a fifteenth embodiment of a protective plate 1541. The protective plate 1541 includes a portion of high strength flexible material 1549, a portion of bonding agent 1550, and a portion of less flexible (stiffer) material 1551. The less flexible (stiffer) material 1551 is less flexible than the high strength flexible material 1549. The less flexible material 1551 may also be buoyant. The protective plate 1541 is resistant to folding and/or rolling due to the less flexible (stiffer) material 1551. FIG. 40d shows the protective plate 1541 in use in the composite material 10.

Figure 41A:
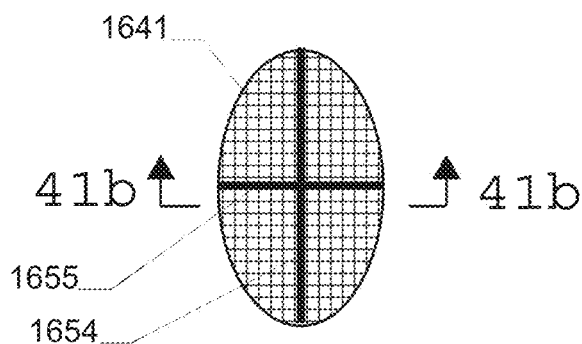
FIG. 41a is a bottom plan view of a sixteenth embodiment of a protective plate used in any embodiment of the composite material and any embodiment of attachment according to the invention.
Figure 41B:
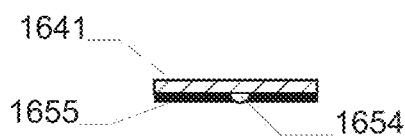

FIGS. 41a and 41b show a sixteenth embodiment of a protective plate 1641. The protective plate 1641 includes a first elongation element 1654 and a second elongation element 1655. The first and second elongation elements 1654, 1655 are oriented along major axes of the protective plate 1641 to keep the material expanded and outstretched, preventing rolling or folding of the material.

Figure 42A:
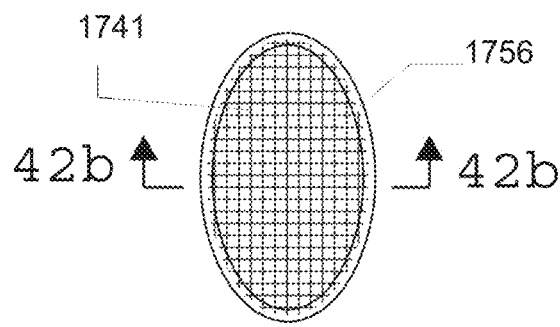
FIG. 42a is a top plan view of a seventeenth embodiment of a protective plate used in any embodiment of the composite material and any embodiment of attachment according to the invention.
Figure 42B:
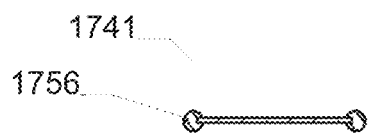

FIGS. 42a and 42b show a seventeenth embodiment of a protective plate 1741. The protective plate 1741 has a perimeter elongation element 1756 keeping the protective plate 1741 expanded and outstretched.

Figure 43A:
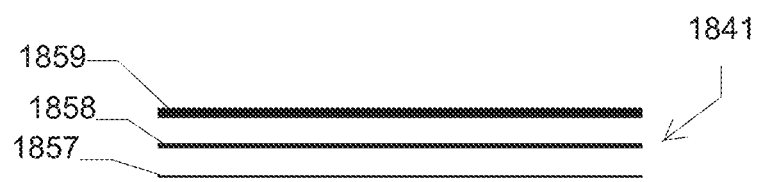
FIG. 43a is a schematic front section view of an eighteenth embodiment of a protective plate used in any embodiment of the composite material and any embodiment of attachment according to the invention.
Figure 43B:
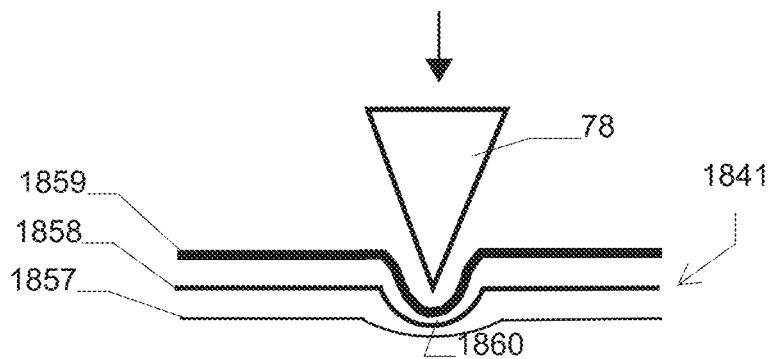
FIG. 43b is a schematic front section view of the protective plate of FIG. 43a, engaging a pointed cutting edge.

FIGS. 43a and 43b show an eighteenth embodiment of a protective plate 1841. The protective plate 1841 includes an outer, middle and inner layer 1859, 1858, 1857. The outer layer 1859 is softer than the middle layer 1858 and the inner layer 1857. The middle layer 1858 is softer than the inner layer 1857. FIG. 43b shows the protective plate 1841 deforming to a threat 78 under a downward force.

Figure 44A:
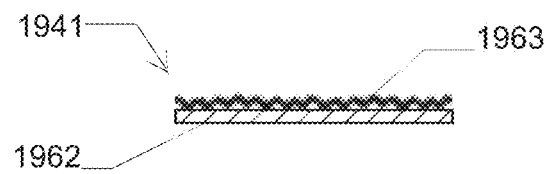
FIG. 44a is a schematic side section view of a nineteenth embodiment of a protective plate used in any embodiment of the composite material and any embodiment of attachment according to the invention.
Figure 44B:
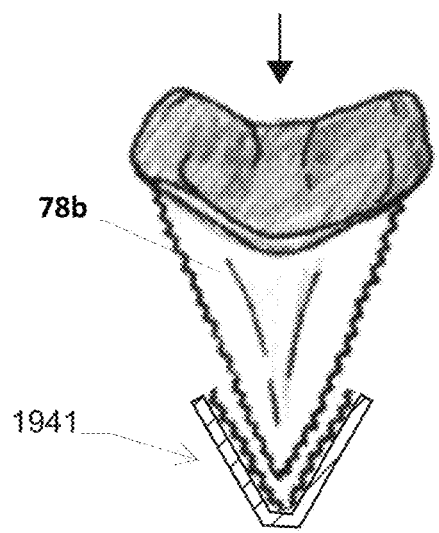
FIG. 44b is a schematic side section view of the protective plate of FIG. 44a engaging a pointed cutting edge.
Figure 44C:
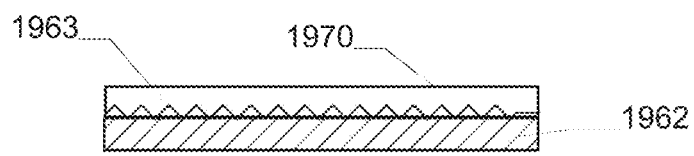
FIG. 44c is a schematic side section view of the protective plate of FIG. 44a covered by a soft outer layer.

FIGS. 44a to 44c show a nineteenth embodiment of a protective plate 1941. The protective plate 1941 has a high strength material layer 1962 and an external surface 1963 bonded thereto. The external surface 1963 substantially matches the surface geometry of the serrated threat 78b. FIG. 44c shows the protective plate 1941 having a sacrificial layer 1970. The sacrificial layer 1970 is soft to prevent unwanted abrasion to other adjacent layers (not shown here), but is also soft enough to allow the serrated threat 78b to penetrate the sacrificial layer 1970 and engage the external surface 1963.

In a preferred embodiment the base layer attachment 43 and cover layer attachment 50 is a thermosetting plastic. As best seen in FIG. 45a to FIG. 46d, the base layer attachment 43 and the cover layer attachment 50 may take any number of forms, shapes, or plurality of shapes.

Figure 46A:
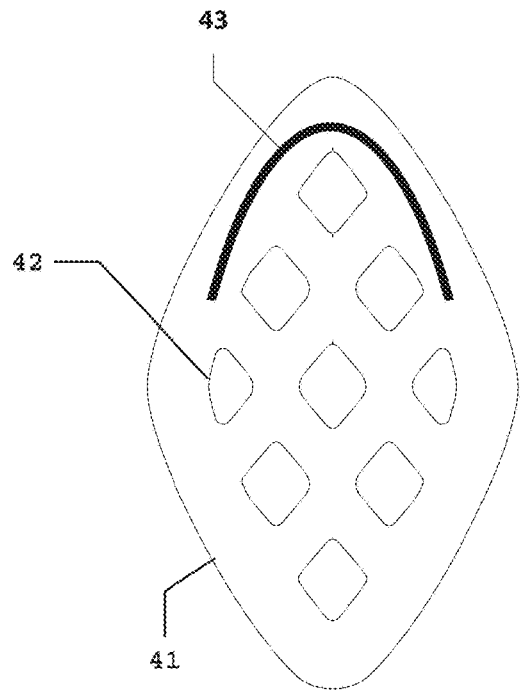
FIG. 46a is a bottom plan view of the protective plate of FIG. 18a, showing a fourth embodiment of attachment as an elongate curve along substantially two axis or directions.
Figure 46C:
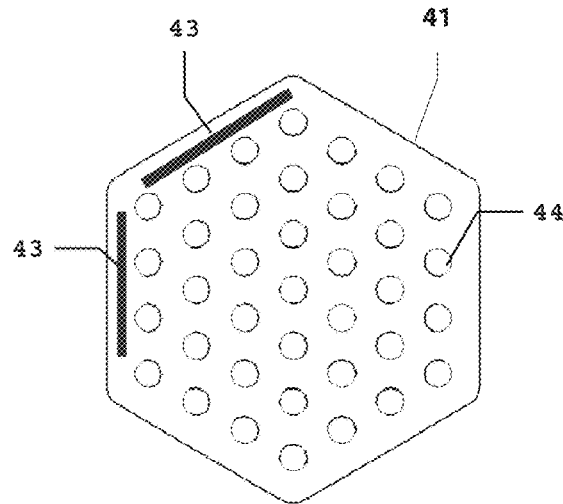
FIG. 46c is a bottom plan view of the protective plate according to FIG. 31a, showing the fifth embodiment of attachment as elongate lines discontinuous on substantially two axis or directions.
Figure 46D:
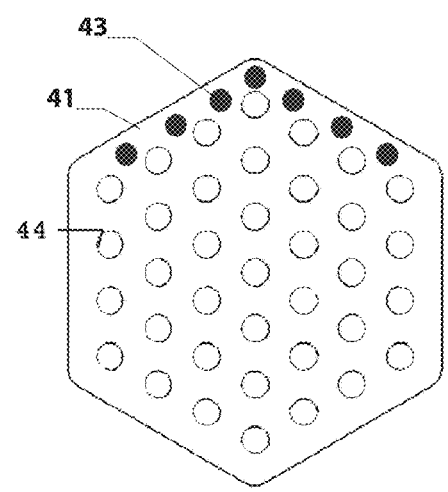
FIG. 46d is a bottom plan view of the protective plate of FIG. 31a, showing a sixth embodiment of attachment as multiple attachment points along substantially two axis or directions.
Figure 46B:
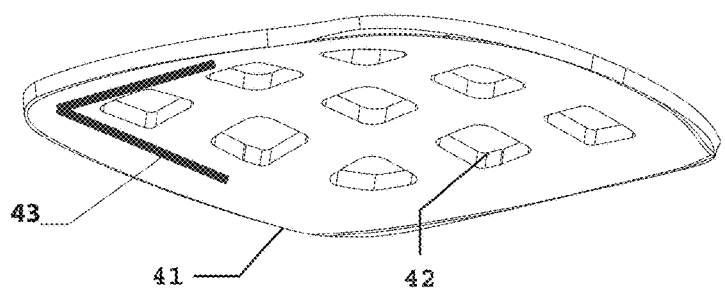
FIG. 46b, is a bottom perspective of the protective plate of FIG. 18a, showing a fifth embodiment of attachment as elongate lines on substantially two axis or directions.

For example, FIG. 45a and FIG. 45d show the base layer attachment 43 formed as an elongate shallow arc. FIG. 45b shows the base layer attachment 43 formed as a straight elongate line, FIG. 45c shows the base layer attachment 43 formed as a series of point attachments in a straight elongate line. The base layer attachment 43 may also preferably be formed in substantially two directions. For example, FIG. 46a shows the base layer attachment 43 formed as an elongate deep arc. FIG. 46b and FIG. 46c show the base layer attachment 43 formed as two straight elongate lines. FIG. 46d shows the base layer attachment 43 formed as a plurality of point attachments in two straight elongate lines.

Figure 34A:
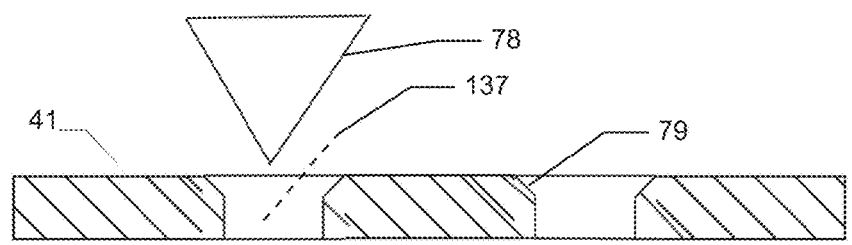
FIG. 34a is a schematic side section view of a protective plate of any embodiment used in the composite material and with any attachment embodiment according to the invention, having partially tapered perforations.
Figure 34B:
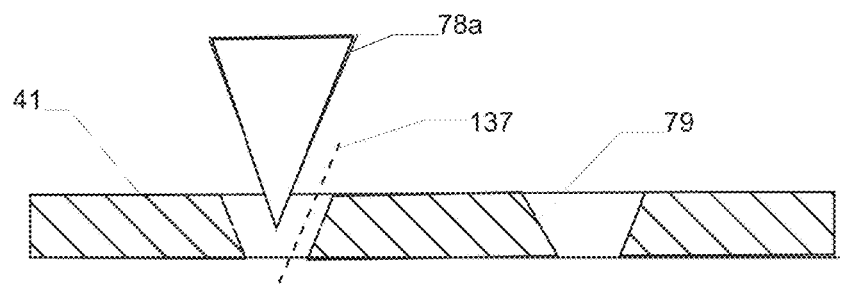
FIG. 34b is a schematic side section view of a protective plate of any embodiment used in the composite material and with any attachment embodiment according to the invention, having fully tapered perforations.
Figure 35:
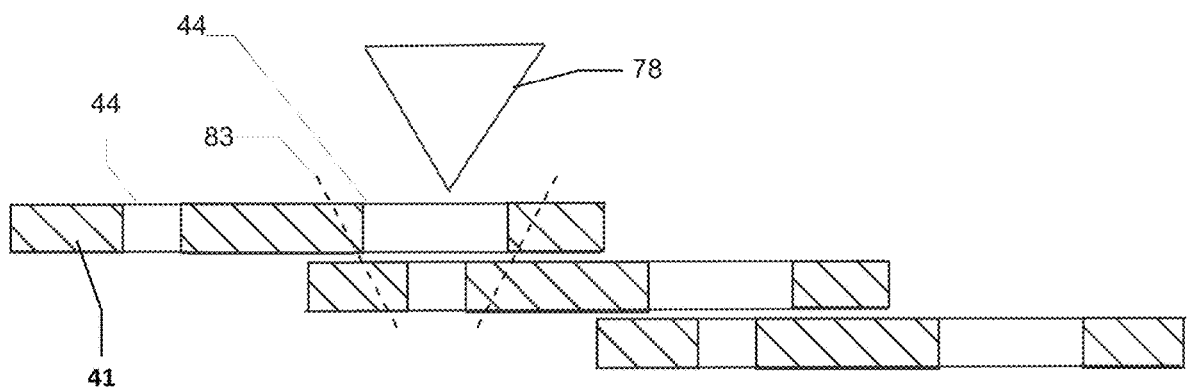
FIG. 35 is a schematic side section view of three overlapping protective plates of any embodiment used in the composite material and with any attachment embodiment according to the invention, having varied sized perforations.

The perforations 44 of the various embodiments of the protective plates 41 may be round or have a custom shape. The perforations 44 may have a chamfer, taper or generally V-like shape 79, as seen in FIGS. 34a and 34b. The taper 79 may either be partial, as shown in FIG. 34a, or complete, as shown in FIG. 34b. The taper 79 has a taper angle 137 that is designed to substantially match the angle of the threat 78. A complete taper 79 is more effective at engaging a more acute threat 78a. The perforations 44 may also have different sizes from one another as shown in FIG. 35, such that, when a protective plate 41 overlies a like protective plate 41, the perforations 44 form a generally V-like shape 83. The perforations may be any size, but are preferred in a range from 5 mm to 14 mm in diameter.

Figure 12:
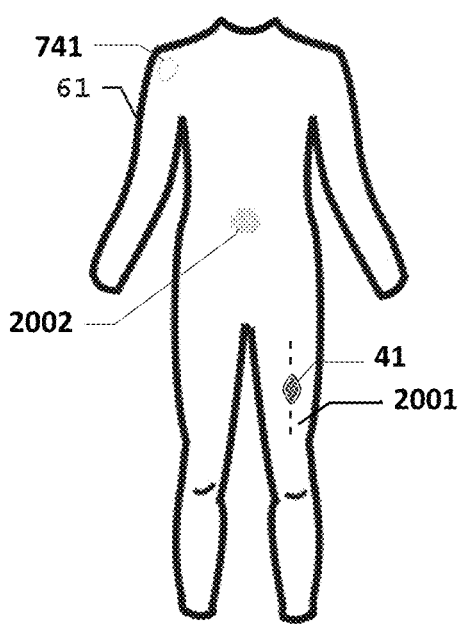
FIG. 12 is a schematic front view of a garment constructed at least partially from a variety of different shaped platelet embodiments to cover different areas of the body.
Figure 13:
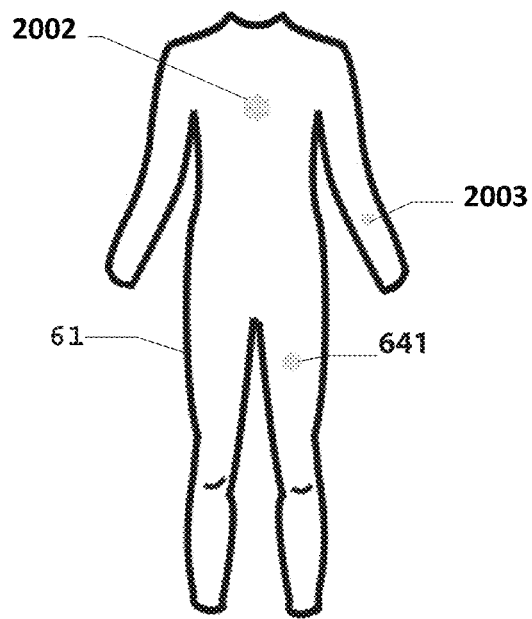
FIG. 13 is a schematic front view of a garment constructed at least partially from a variety of different sized platelet embodiments to cover different areas of the body.
Figure 14A:
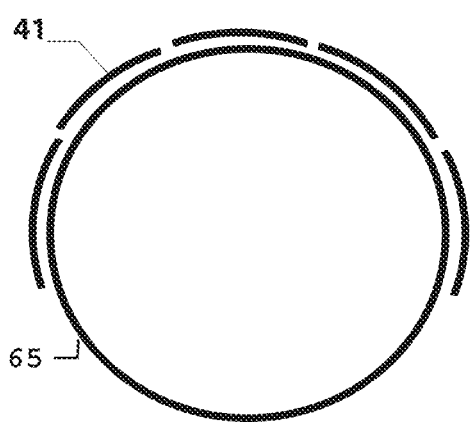
FIG. 14a is a schematic front view of a protective plate used in the composite material according to the invention conforming to a curved surface.
Figure 14B:
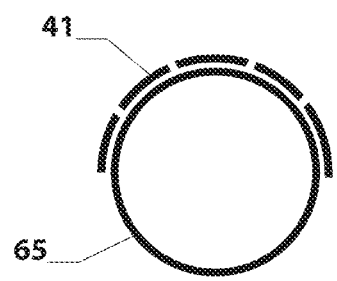
FIG. 14b is a schematic front view of a protective plate used in the composite material according to the invention, congruent to the protective plate shown in FIG. 14a but having a smaller curve radius and smaller overall dimensions, conforming to a curved surface.

As shown in FIG. 13, the protective plates may have different dimensions 2003, 641, 2002, whilst retaining substantially the same shape. The size of the protective plates 41 may be any size, but are preferred in a range in length in section from 30 mm to 80 mm. As shown in FIG. 12, the protective plates may have different shapes 41, 2002, 741 to better fit different areas of the body when used in a garment. As shown in FIGS. 14a and 14b, the radius of curvature of the protective plates 41 may be any radius, but are preferred in a range from 70 mm to 140 mm.

The composite material 10 may be constructed in a number of methods from the various embodiments of protective plates 41 and embodiments or methods of attachment.

In addition to the first and second embodiments of the composite layer 10 already discussed, there are herein disclosed a number of further embodiments.

Figure 6:
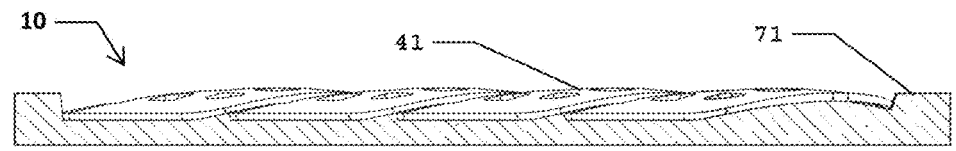
FIG. 6 is a side section view of a third embodiment of the composite material according to the invention.

FIG. 6 shows a third embodiment of the composite material 10, wherein the base layer is a material 71 that is shaped or moulded to conform to the underside of the protective plates 41. A portion of each protective plate 41 is attached to the material 71, while a substantial surface area of each protective plate 41 remains unattached to allow extension of the material 71.

Figure 7A:
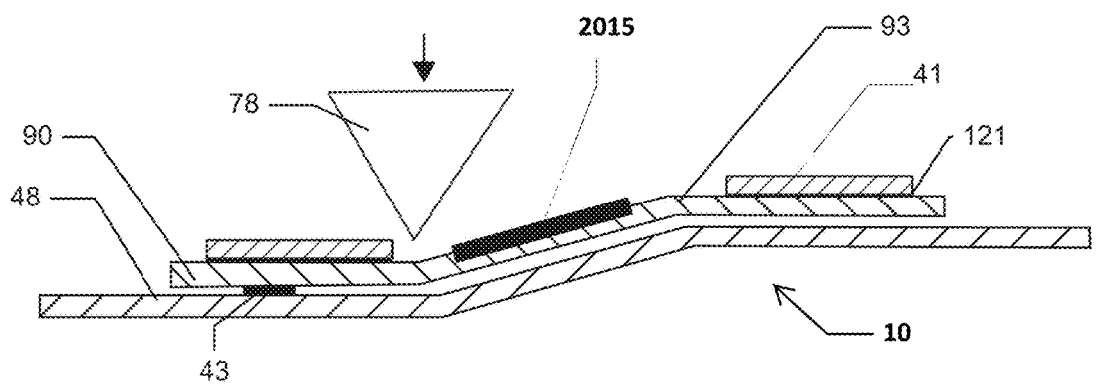
FIG. 7a is a schematic side section view of a twenty second embodiment of a protective platelet as a carrier array according to the invention, engaging a threat.

FIG. 7a shows a second embodiment of a protective platelet as a carrier array, shown here in a second embodiment of the composite material 10 without a cover layer, wherein the carrier array protective plate assembly is comprised of smaller protective plates 41, mounted on a carrier layer 90, by a continuous or semi continuous attachment 121. A protective plate 2015 may also be infused partially or fully into or cured onto the carrier layer 90. The areas of the carrier layer 90 between the protective plates 41 act as a living hinge 43 to allow flexibility of the composite material 10. The carrier layer 90 is attached to the base layer 48 using the base layer attachment 43 which would be similar to mounting other embodiments of plates to a base layer.

Figure 7B:
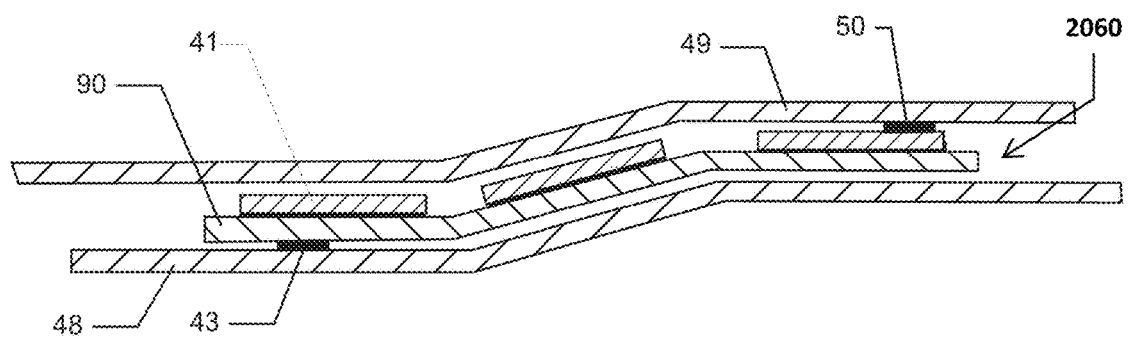
FIG. 7b is a schematic side section view of twentieth embodiment of a protective platelet as a carrier array, within the first embodiment of the composite material utilizing a cover layer.
Figure 7C:
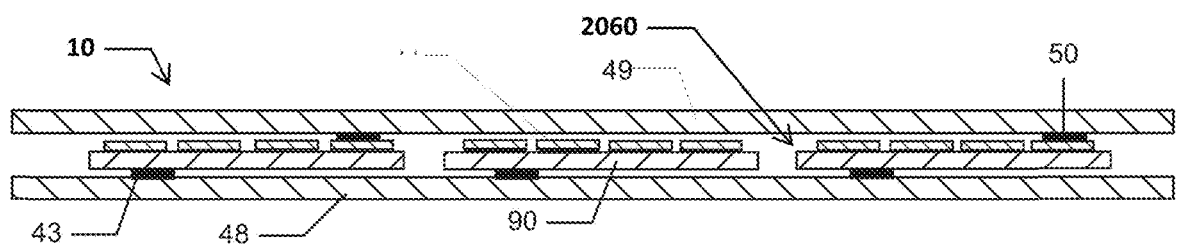
FIG. 7c is a schematic side section view of a plurality of three protective platelets as carrier arras, within the first embodiment of the composite material with an intermittently attached cover layer.

As shown in FIG. 7b, the carrier array platelet assembly 2060, comprised of a base layer 90, and a plurality of protective platelets 41, is an assembly which can be bonded 43 to a base layer 48, and bonded 50 to a cover layer 49. Preferably, the cover layer attachment 50 is located opposite the base layer attachment 43 of an adjacent carrier layer 90. FIG. 7c shows the first embodiment of the composite material 10 having intermittent attachment 50 from the cover layer 49 to the three carrier arrays 2060, and regular attachment 43 from the carrier arrays 2060 to the base layer 48.

Figure 8A:
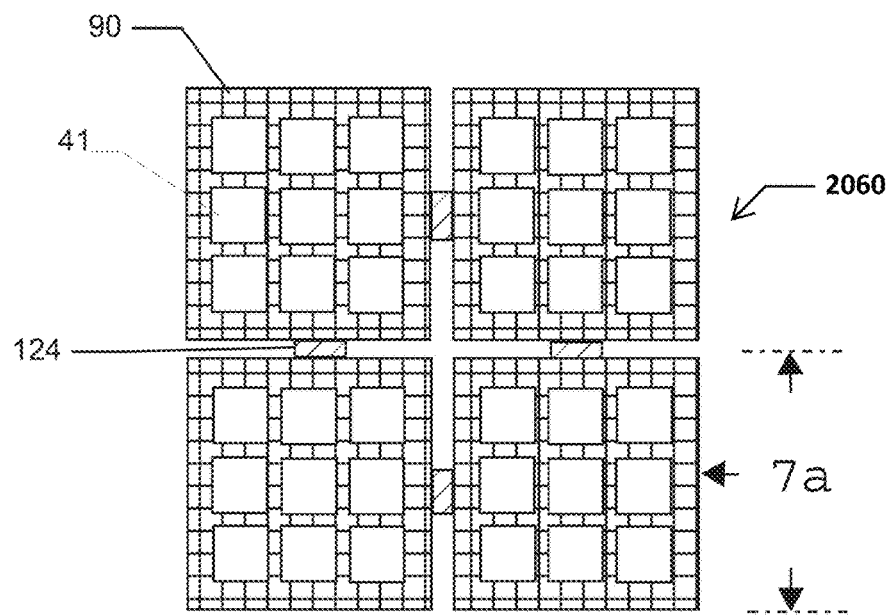
FIG. 8a is a top plan view of a fifth embodiment of the composite material according to the invention.

FIG. 8a shows a fifth embodiment of the composite material 10. This includes four carrier array protective platelet assemblies 2060, each comprised of a base layer 90, and nine protective platelets 41 in a two-dimensional array. Four carrier array platelets 2060 are arranged in a two dimensional array and connected to each other in a side by side arrangement using flexible and preferably elastic carrier layer link 124 attached between substantial edges of the carrier arrays 2060.

Figure 8B:
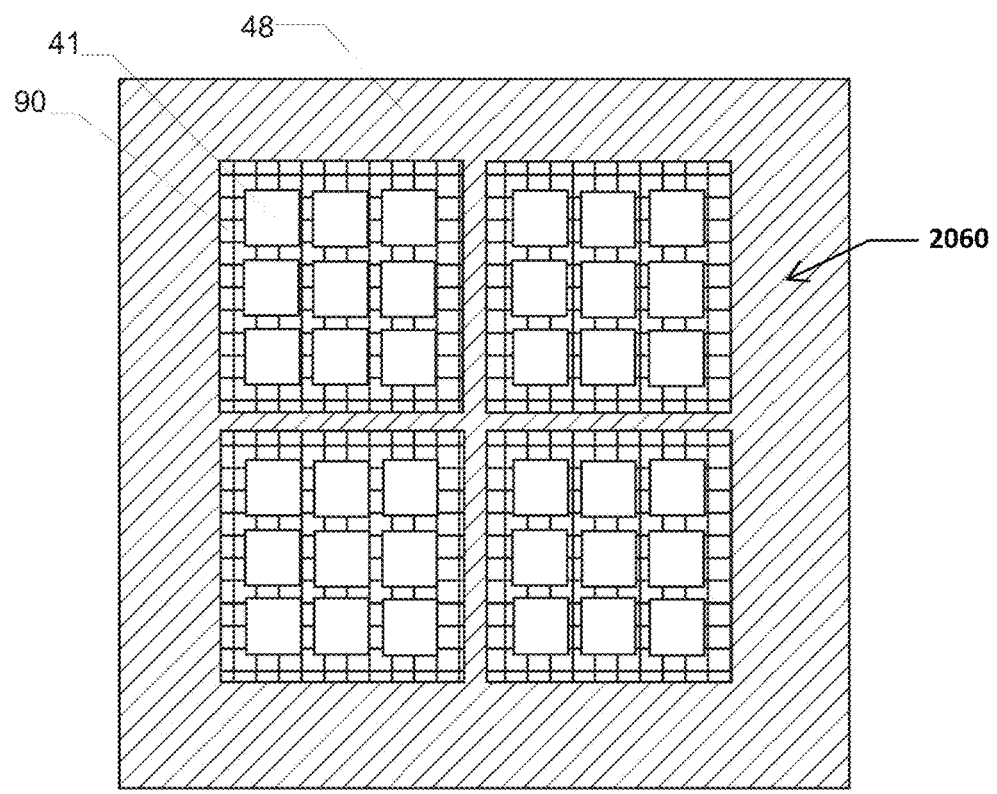
FIG. 8b depicts a plan view of four the twentieth embodiment of protective platelets as carrier arrays over a base layer.

FIG. 8b shows the second embodiment of the composite material 10 with a base layer 48, four carrier array protective platelet assemblies 2060. Each of the four carrier array protective platelet assemblies 2060, is comprised of a base layer 90, and nine protective platelets 41 in a two-dimensional array. Four carrier array platelets 2060 are arranged in a two dimensional array and connected to the base material 48 with any of the attachment embodiments or methods. This allows the base material 48 to expand and contract with limited bonding to the carrier array platelets 2060.

Figure 9A:
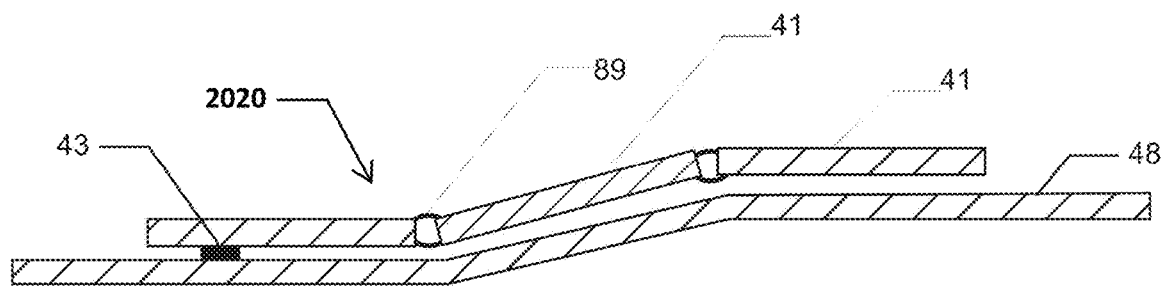
FIG. 9a is a schematic side section view of a twenty first embodiment of a protective platelet as a linked array in the second embodiment of the composite material with a base layer and no cover layer.
Figure 9B:
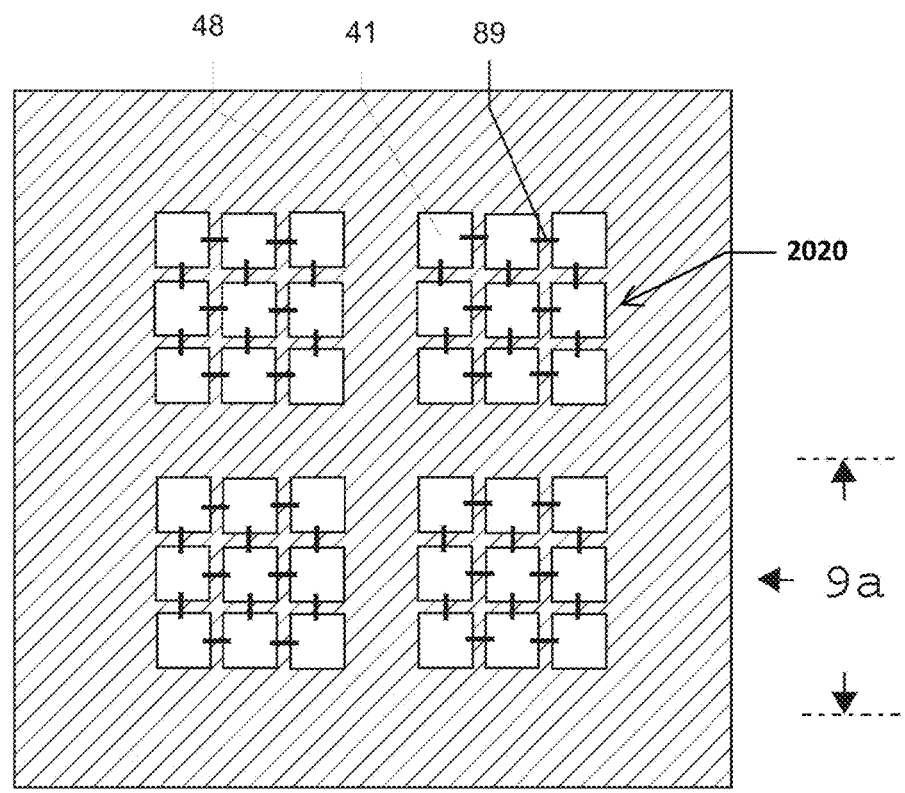
FIG. 9b is a top plan view of the composite material of FIG. 9a using four protective platelets as linked arrays each with nine protective plates on a base layer.
Figure 9C:
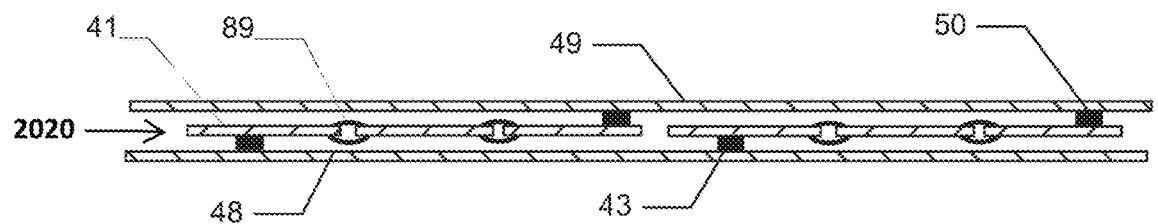
FIG. 9c is a schematic side section view of two protective platelets as linked arrays of FIG. 9a, within the first embodiment of the composite material including a cover layer and utilizing an opposing attachment configuration.

As seen in FIG. 9a, a linked array platelet assembly 2020 can be attached 43 to a base layer 48 similar to other platelet embodiments, in the second embodiment of the composite material 10. This linked array protective platelet is comprised of a plurality of individual protective plates 41, linked to other protective plates 41 using a hinge 89, instead of being mounted on a carrier layer 90 (not shown here). FIG. 9b shows four linked array platelet assemblies 2020, each comprised of nine platelets 41, and twelve flexible links between platelets. These four linked arrays are each mounted to the base layer 48 via limited and various attachment embodiments and methods. FIGS. 9a and 9b show the second embodiment of the composite material. As shown in FIG. 9c, the first embodiment of the composite material is shown including a base layer 48, linked array protective platelets 2020, and a cover layer 49. Cover layer attachments 50 connect the linked array protective assemblies 2020 to the cover layer 49. Preferably, the cover layer attachments 50 are situated substantially opposite the base layer attachments 43 of an adjacent two-dimensional array of protective plates 41.

Figure 10:
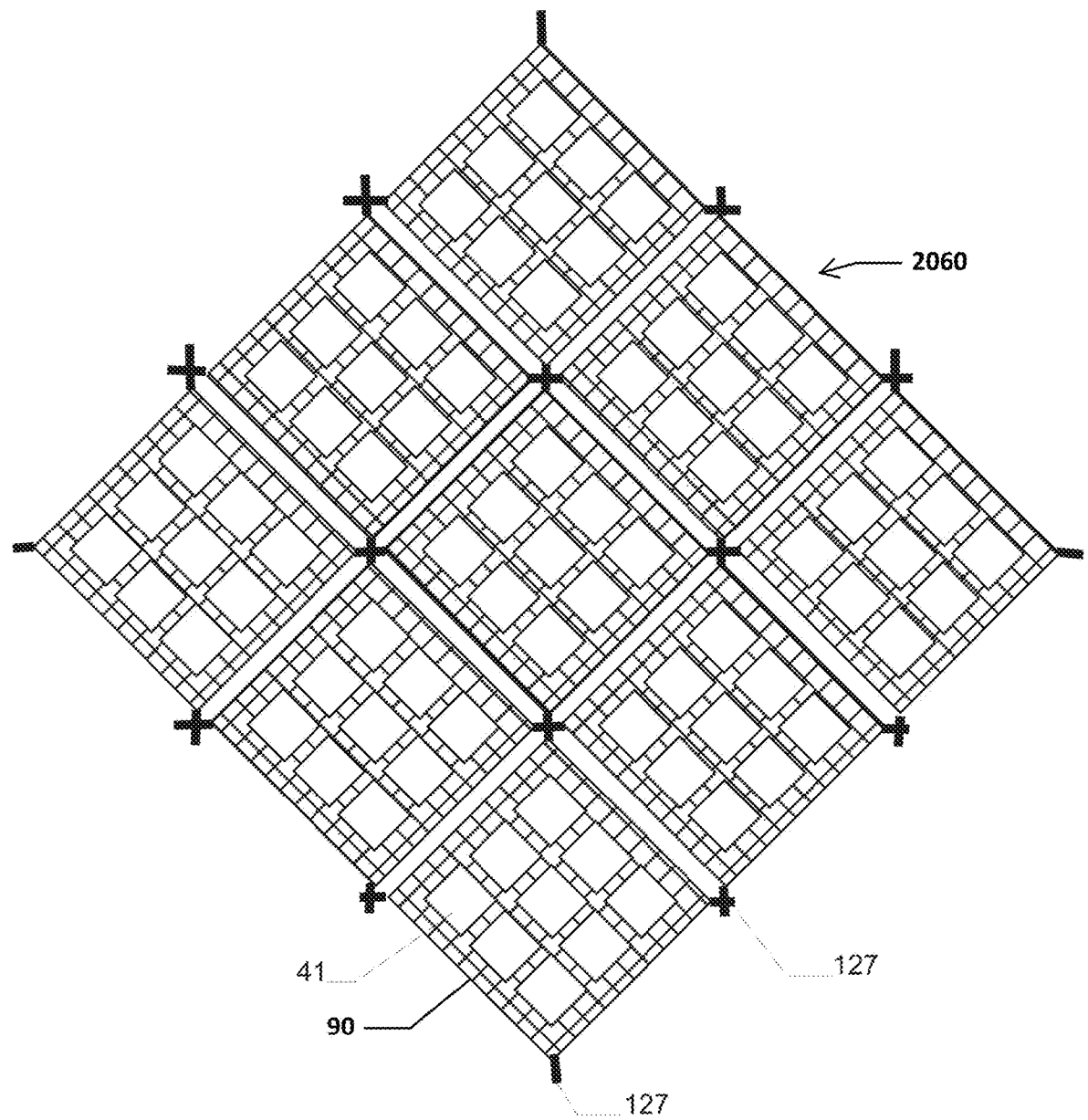
FIG. 10 is a top plan view of a fourth embodiment of the composite material utilizing nine protective platelets as carrier arrays, which are connected by elastic elements at substantial respective corners.

FIG. 10 shows a fourth embodiment of the composite material, connecting substantial corners of protective platelets to one another. FIG. 10 shows nine carrier array protective platelet assemblies 2060, each comprised of a carrier layer 90, and nine protective platelets 41. Each carrier array protective platelet 2060 is connected to other carrier array protective platelets 2060 by a flexible and preferred elastic connection 127 at the substantial corners or outward poles to maintain each carrier array 2060 in an outstretched, expanded position.

Figure 11A:
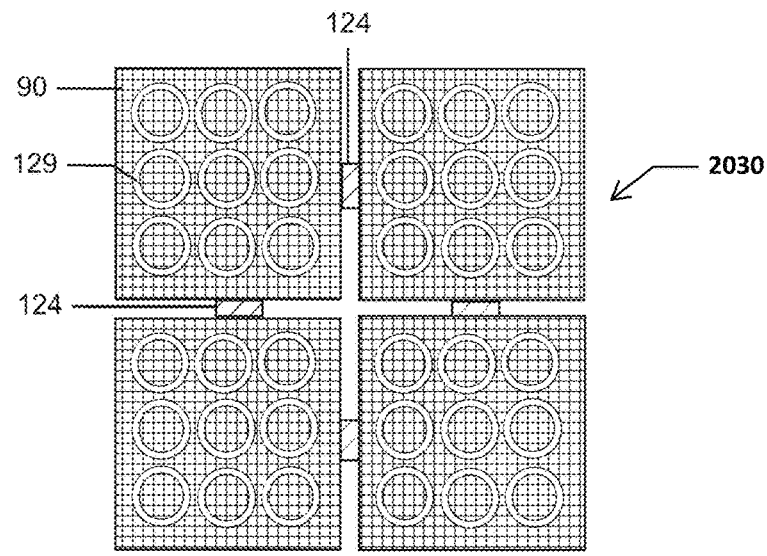
FIG. 11a is a top plan view of the fifth embodiment of the composite material according to the invention, similar to FIG. 8a, utilizing four protective platelets as carrier arrays, each carrier array utilizing a plurality of ring elements.

FIG. 11a shows the fifth embodiment of the composite material utilizing four carrier array protective platelet assemblies 2030, each comprised of a carrier base layer 90, and nine protective rings 129 in a two-dimensional array. Four carrier array platelets 2030 are arranged in a two dimensional array and connected to each other in a side by side arrangement using flexible and preferably elastic carrier layer link 124 attached between substantial edges of the carrier arrays 2030.

Figure 11B:
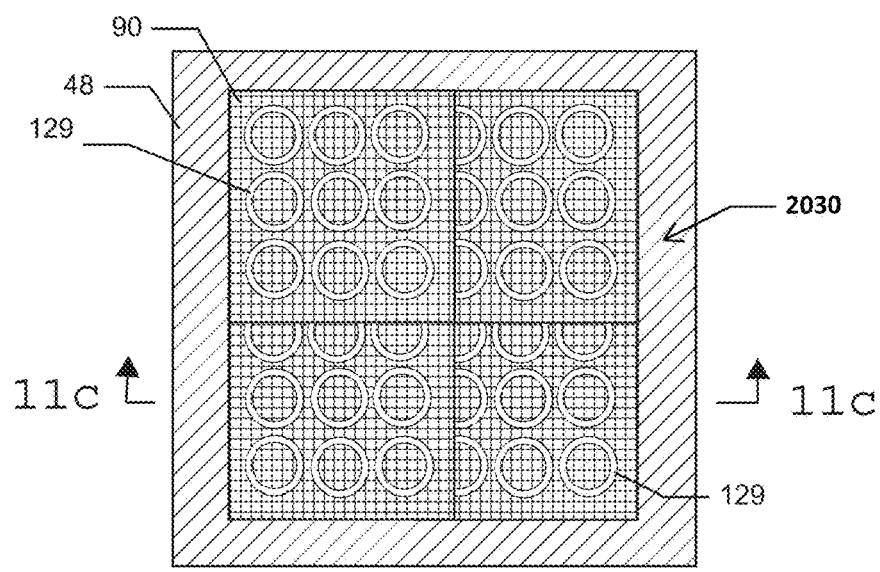
FIG. 11b is a top plan view of the second embodiment of the composite material utilizing four protective platelets as carrier arrays in an overlapping arrangement, each attached to a base layer.
Figure 11C:
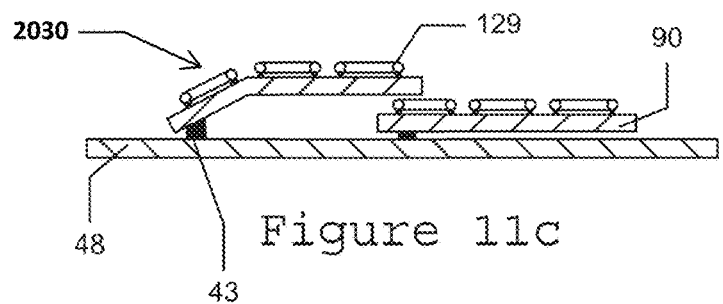
FIG. 11c is a schematic side section view of the composite material of FIG. 11b.

FIG. 11b shows the second embodiment of the composite material 10 with a base layer 48, four carrier array protective platelet assemblies 2030. Each of the four carrier array protective platelet assemblies 2030, is comprised of a base layer 90, and nine protective rings 129 in a two-dimensional array. Four carrier array platelets 2030 are arranged in a two dimensional array and connected to the base material 48 with any of the attachment embodiments or methods. This allows the base material 48 to expand and contract with limited bonding to the carrier array platelets 2030. Note in FIGS. 11b and 11c the carrier array protective platelets are overlapped. FIG. 11c shows the composite material of FIG. 11b in section.

Figure 15:
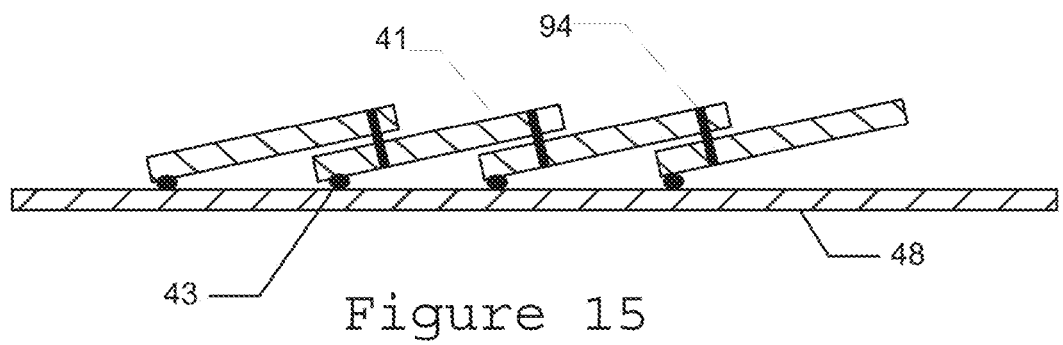
FIG. 15 is a schematic side section view of a seventh embodiment of the composite material according to the invention using a maximum elongation limiting element.
Figure 16:
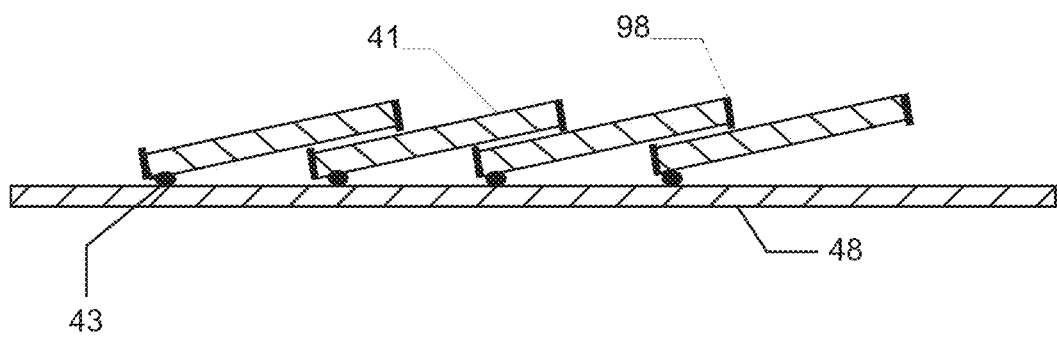
FIG. 16 is a schematic side section view of the composite material of FIG. 15 in an alternative arrangement.

FIGS. 15 to 17b show a seventh embodiment of the composite material 10, wherein the protective plates 41 are permanently or conditionally linked. As seen in FIG. 15, a protective plate 41 may be linked to a like protective plate 41 using a slotted link 94, which allows expansion and contraction to maximum limits. As seen in FIG. 16, the protective plates may also, or instead, include a protrusion 98 on the trailing edge 102 that is adapted to engage a like protrusion 98 on the leading edge 103 of a like protective plate 41.

Figure 17A:
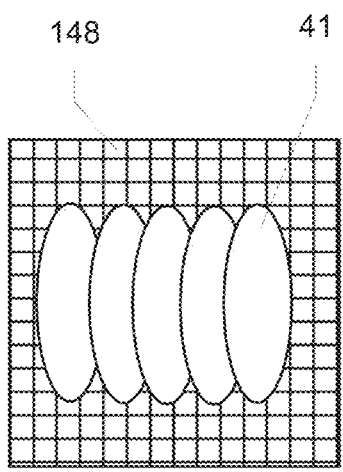
FIG. 17a is a schematic top plan view of the composite material of any embodiment in a relaxed state.
Figure 17B:
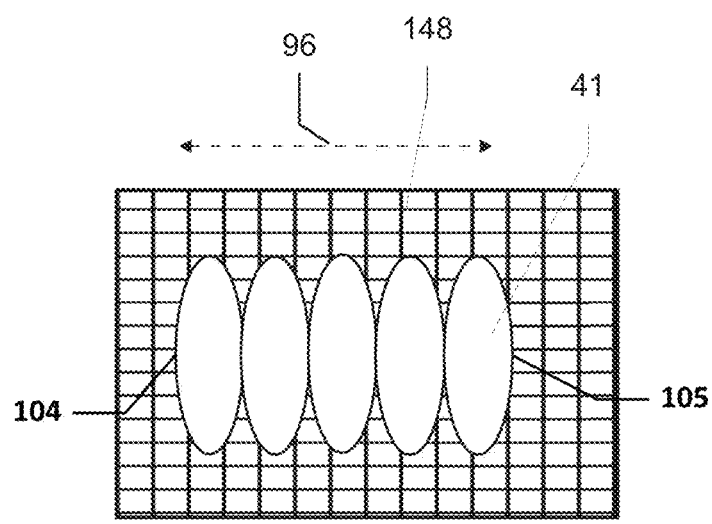
FIG. 17b is a schematic top plan view of the composite material of FIG. 17a in an expanded state.

Similarly to the methods shown in FIGS. 15 and 16, the composite material 10 may use a base layer 48 which has an inherent maximum expansion threshold. This is achieved by the maximum elongation of fibers, threads weaving patterns, knitting patterns, etc. within the base 148, which can be fabric, net, material, rubber sheet, or any number of elastic materials with maximum elongation properties. In this composite material the base layer 48 is a limitedly elastic base layer 148. FIG. 17a shows the composite material 10 in a relaxed, or contracted, state. FIG. 17b shows the composite material 10 in a stretched, or expanded, state in the direction of expansion 96. The limitedly elastic base layer 148 prevents expansion of the composite material 10 beyond the point where the protective plates 41 are touching or minimally overlapping at their respective first lateral portions 104 and second lateral portions 105. The limitedly elastic base layer 148 may be an additional layer to the base layer 48, i.e. both the base layer 48 and the limitedly elastic base layer 148 may be present in the composite material 10.

Figure 47A:
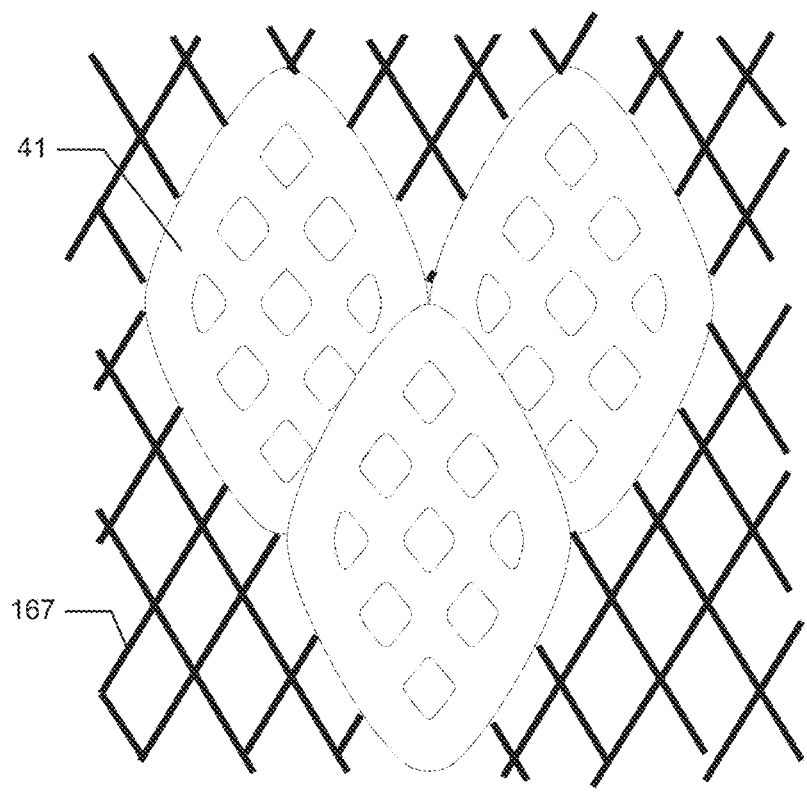
FIG. 47a is a top plan view of the eighth embodiment of the composite material, with three protective plates according to FIG. 18a, attached to a net base layer.
Figure 47B:
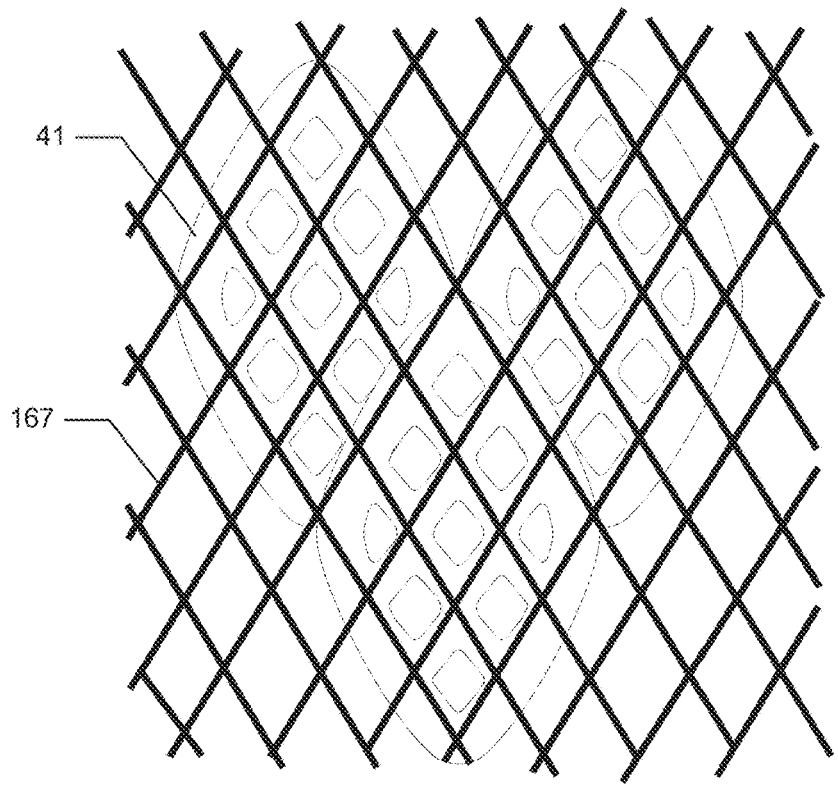
FIG. 47b is a bottom plan view of the composite material of FIG. 47a, depicting the protective plates attached to a web.

FIGS. 47a to 47b show an eighth embodiment of the composite material 10, wherein the protective plates 41 are attached to a web 167. The web 167 may be a net or another form of material that is flexible and, preferably, elastic. However, high strength non-elastic materials such as aramid thread or steel cable may also be used.

Figure 48A:
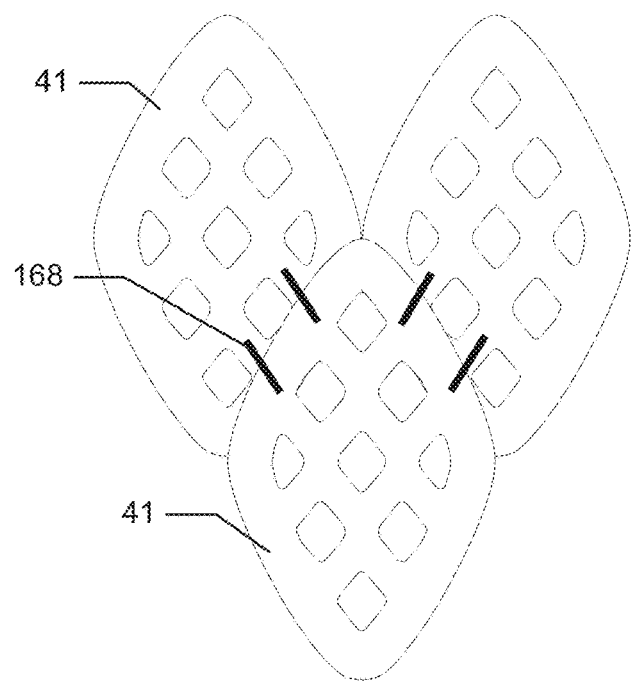
FIG. 48a is a bottom plan view of the sixth embodiment of the composite material, with protective plates according to FIG. 18a, showing attachment of adjacent protective plates using a number of discontinuous strands.
Figure 48B:
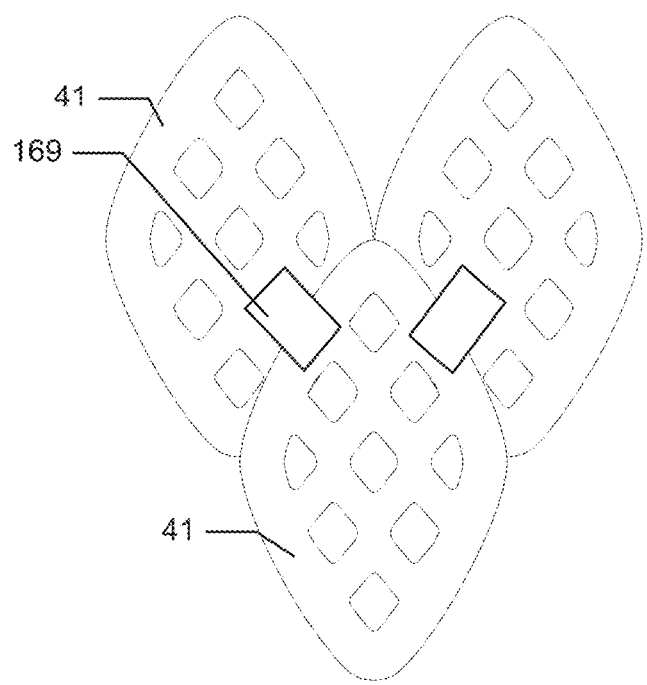
FIG. 48b is an alternate embodiment of the sixth embodiment of the composite material, showing the bottom plan view of three protective plates according to FIG. 18a, with attachment of adjacent protective plates using a number of discontinuous material portions.

FIG. 48a shows a sixth embodiment of the composite material, wherein the protective plates 41 may be connected using strands 168 of flexible or preferably elastic material. The strands 168 could also be embodied, as shown in FIG. 48b, as strips of flexible material 169. This discontinuous strands or material portions can be of any shape, size, pattern or layout.

Figure 49:
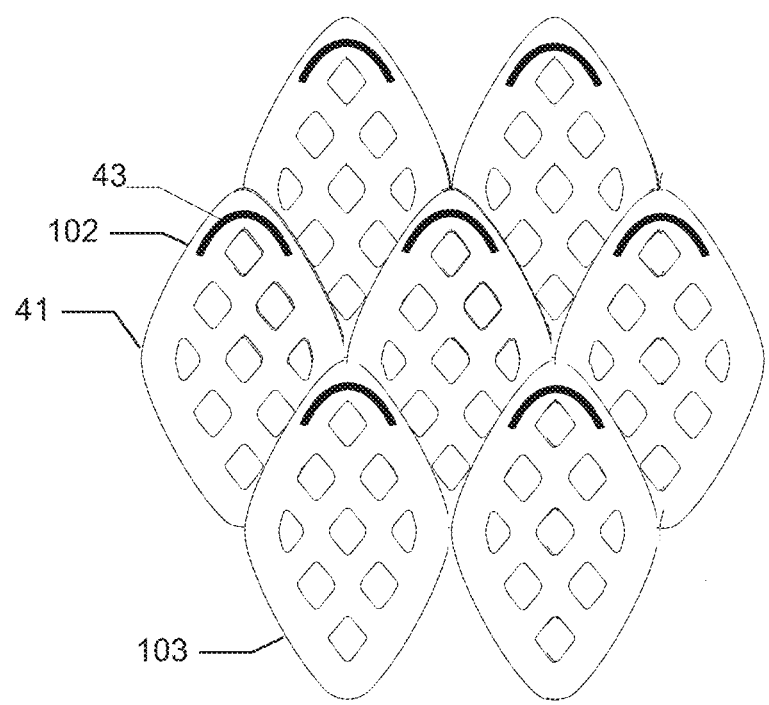
FIG. 49 is a bottom plan view of seven protective plates according to FIG. 18a showing the fourth embodiment of attachment as elongate curves along substantially two axis or directions, along seven platelets leading edges, where the trailing edges are not visible in the overlap.

FIG. 49 shows the underside of a plurality of platelets 41, depicting the overlap of leading edges 102 and trailing edges 103, and noting the attachment 43 to a base layer (not shown here).

Use of the improved puncture and cut resistant material will now be described.

The composite material 10 according to the preceding embodiments (and combinations thereof) may be used in the construction of a garment 61, as seen in FIGS. 12 and 13. In the construction of the garment 61, a variety of the protective plates 41, 641, 741, 2002, 2003 disclosed herein may be used at different locations of the garment 61 to best respond to the demands of the individual locations.

Figure 2:
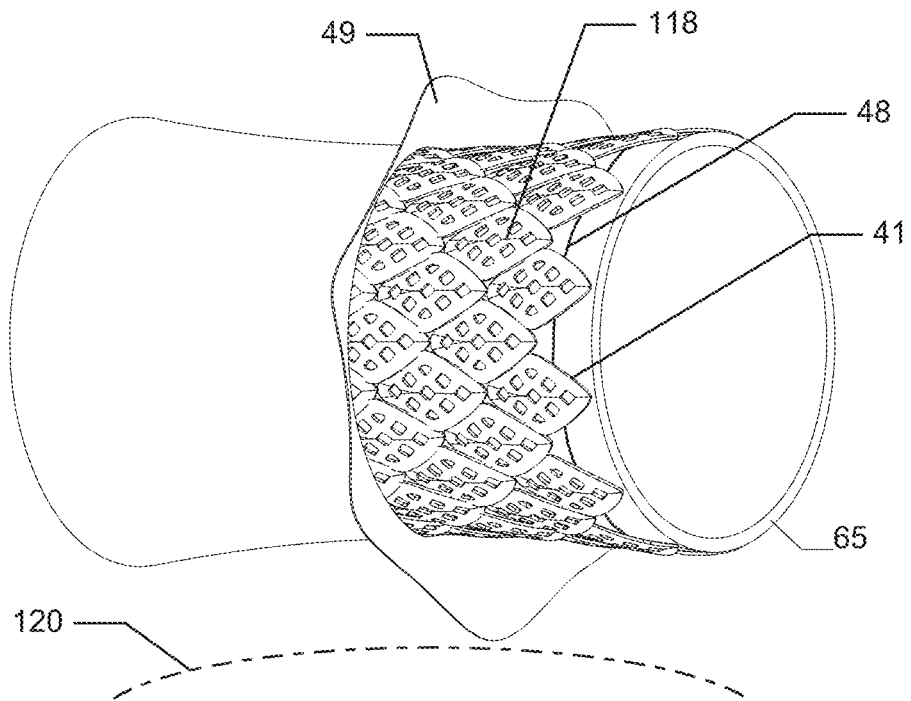
FIG. 2 is a perspective view of the composite material of FIG. 1 conforming to a concave object.
Figure 3A:
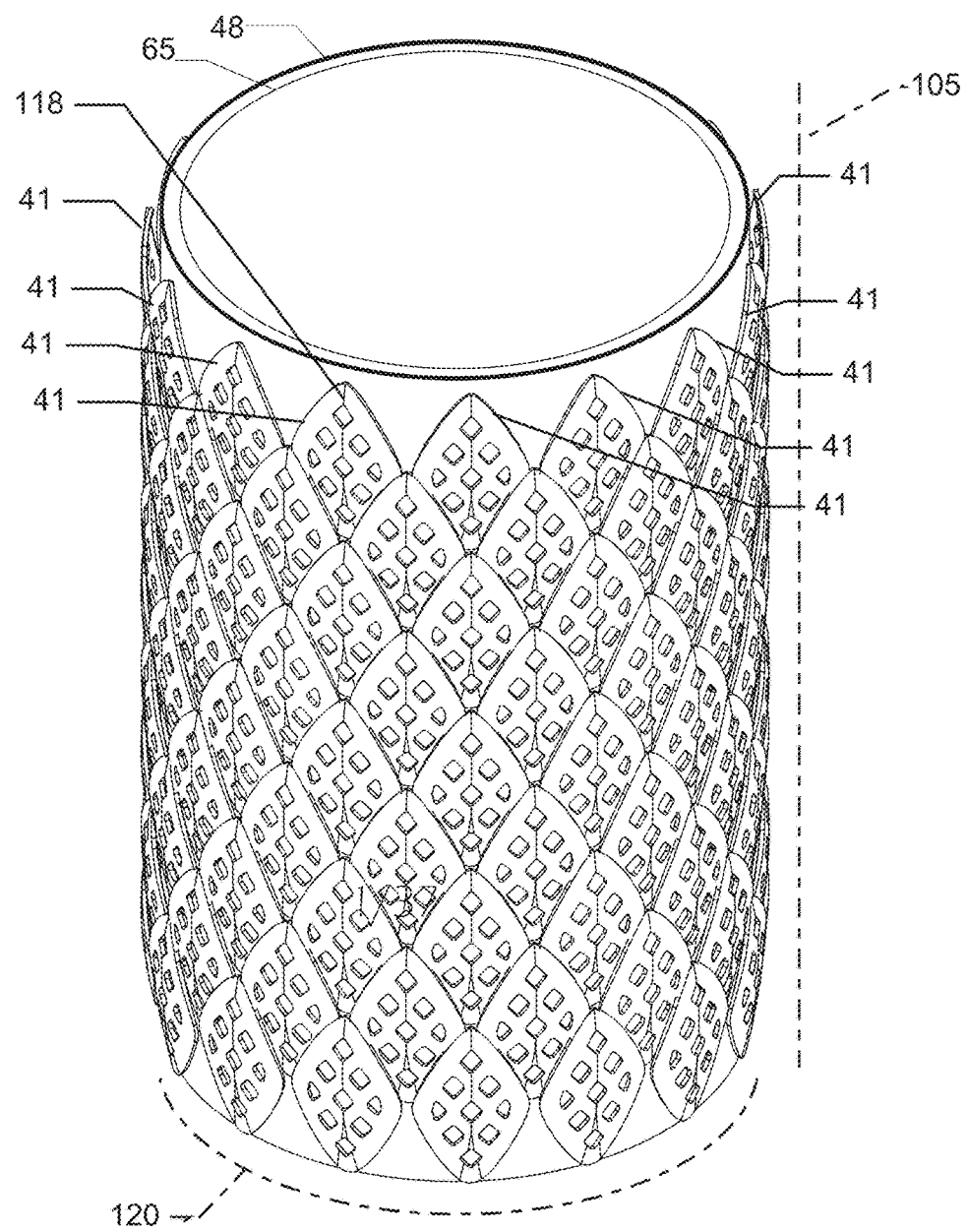
FIG. 3a is a perspective view of a second embodiment of the composite material conforming to a cylindrical object.
Figure 3B:
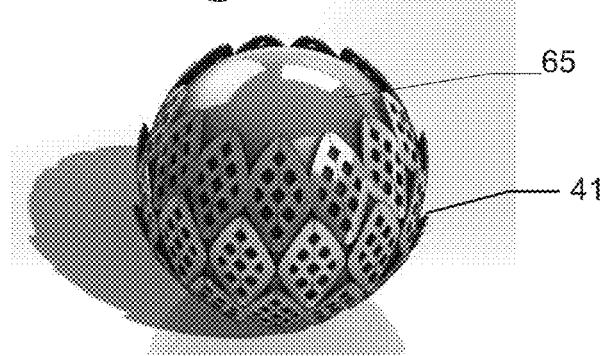
FIG. 3b is a perspective view of the composite material of FIG. 3a conforming to a spherical object.
Figure 4:
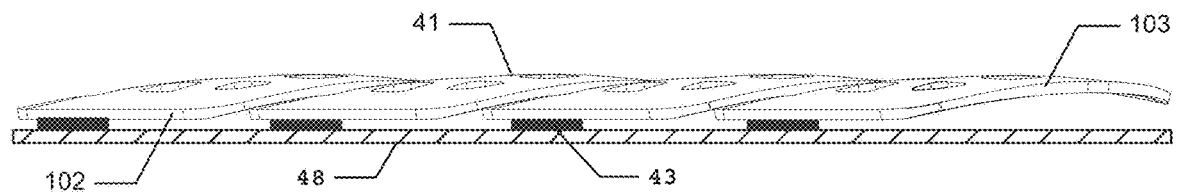
FIG. 4 is a side section view of the second embodiment of the composite material according to the invention.

For example, as shown in FIG. 14a, protective plates 41 having a curvature may be used in locations having a curvature. Further, as seen in FIGS. 2, 3a and 3b, protective plates 41 having a curvature in a first and a second direction may be used in locations having a curvature in two directions. Yet further, as seen in FIG. 14b, smaller sized protective plates 41 may be used in locations with a small expected radius of curvature of a shape 65 to be covered by the garment 61.

In an exemplary embodiment shown in FIG. 13, the torso area of the garment 61 uses large specimen of the protective plate 2002 having a size of about 80 mm in section, the upper leg area of the garment 61 uses specimen of the protective plate 641 having a size of about 50 mm in section, and the forearm area of the garment 61 uses smaller specimen of the protective plates 2003 having a size of about 30 mm in section. In FIG. 12, different shaped platelets are utilized. The upper leg utilizes a diamond shaped platelet 41, which longer axis aligns in parallel to the leg plane 2001.

The torso utilizes a hexagon shaped platelet 2002 that is curved in one axis, and the shoulder utilizes a hexagon shaped plate 741 curved in two axis (also shown in FIGS. 31d, 31e, and 310.

The perforations 44 of the protective plates 41 may be tapered or layered, as shown in FIGS. 34a and 34b, to conform to a sharp-edged pointed threat 78. The layering of the protective plates 51 having differently sized perforations 44 similarly conforms to the sharp-edged pointed threat 78, as shown in FIG. 35. Another strategy to introduce more protective surface area to a tapered threat is depicted in FIGS. 36a to 36c, by way of nested rings on an elastic base. The smallest ring 1039, the medium sized ring 1038, and the larger ring 1029, all next within one another, and when impacted by the downward force of a tapered threat 78 as shown in FIG. 37c, all three nested rings can come in contact with the threat simultaneously.

The buoyant material 1186 in the perforations 1144, as shown in FIG. 37b, of the protective plates 1141 acts to increase the buoyancy of the composite material 10, and garments 61 constructed therewith. Similarly, the waterproof layer 1187 prevents water 84 from entering the perforations 1144, which creates an air pocket in each perforation 44, increasing the buoyancy of the composite material 10.

In the embodiments shown in FIGS. 7a to 11c, depicts various embodiments of protective platelets in the form of carrier array assemblies 2030, 2060, and linked arrays 2020. These allow a plurality of protective plates to be combined into assemblies which remain flexible and pliable. A form of a carrier array is also shown in FIGS. 38d and 38e, whereby a high strength material base is combined with a bonding agent, in an arrangement that creates gaps 1341 that serve to make living hinges or more flexible areas without the bonding agent. Each carrier array assembly, or linked array assembly, or partially infused carrier array, acts like a single protective platelet, within any of the composite material embodiments. Also, they may each be connected to each other, or to base and cover layers by any of the attachment embodiments or methods, or combinations thereof.

The composite material 10 is further strengthened by the attachment of at least one protective plate 41 of each set of protective plates 41 to a cover layer 49.

The expansion prevention means, that is the slotted link 94, the protrusions 98 and the limitedly elastic base layer 148, of FIGS. 15 to 17b each act to prevent the elastic base layer 48 from expanding such that the protective plates 41 no longer overlap. The slotted link 94 slides along a slot (not shown) in the protective plate 41, until it reaches a limiting position (not shown). At the limiting position the slotted link 94 is in tension between the protective plates 41 and prevents further movement of the protective plates 41 relative to each other and thereby prevents further expansion of the composite material 10.

Similarly, the protrusions 98 engage one another when the protective plates 41 are moved to a limiting position where there is a danger of a lack of overlap. At the limiting position, the protrusions 98 are in tension between the protective plates 41 and prevent further movement of the protective plates 41.

Finally, the limitedly elastic base layer 148 is configured such that it reaches its maximum elongation at a point where there is a danger of a lack of overlap between adjacent protective plates 41. Thus, further movement of the protective plates 41 is resisted by the limitedly elastic base layer 148 preventing further expansion of the composite material 10.

Advantages of the composite material 10 will now be discussed.

The attachment of protective plates 41 to the base layer 48 allows the composite material 10 to conform to a variety of shapes by expanding or contracting, decreasing and increasing the overlap of the protective plates 41, respectively.

The various attaching means 43 shown in different embodiments in FIGS. 45a to 48b resist pivoting of the protective plate 41 relative to the base layer 48. This prevents the protective plates 41 rotating out of alignment and providing edges for equipment to snag on the protective plates 41. The prevention of out-of-alignment rotation also prevents the exposure of the base layer 48 to a threat 78.

The attaching means 43 as shown in FIGS. 46a to 46d resist lifting of the protective plates 41 at the perimeter, particularly when the attaching means 43 is located at an edge of the protective plate 41 and traverses down a portion of the perimeter edge as an elongated attachment. This further reduces the risk of snagging equipment on a lifted protective plate 41 in use, or exposing the base layer 48 to a threat 78.

Utilizing an attachment along substantially two axis such as depicted in FIGS. 46a to 46d further reduce pivoting and lifting of plates, compared to elongated attachments of FIGS. 45a to 45b. By attaching in substantially one elongated axis, the plates can lift in a perpendicular axis in a "flapping" effect. By attaching in substantially two axis, the plates are held in relative position in two perpendicular axis.

The attachment of the protective plates 41 to the cover layer 49 further reduces the risk of lifting and pivoting of the protective plates 41. It also increases the structural strength of the composite material 10, for example by impinging tears in the cover layer 49 and by providing a load path through the cover layer 49 in tension, making the composite material 10 more resilient. It also prevents water 84 that may have collected in the interstitial spaces between the base layer 48 and the cover layer 49 from causing expansion of the cover layer 49 when a user exits a body of water, for example.

The orientation and position of the attaching means 43 may be selected such that the composite material 10 is most elastic in a desired direction, and least elastic in another desired direction. Generally, the attaching means 43 is placed perpendicularly to directions of most desired elasticity. This is shown in FIG. 12, where the longer plane of the platelet shape, allows the plane of elongation of attachment essentially parallel to the longer plane of the object covered, in this case the plane of the leg 2001. Further, shapes of protective platelets can be oriented such that the longer cross section of the plate (including plate assemblies such as carrier arrays, linked arrays, infused arrays, etc), aligns with longer section of the covered object. For example, the longer section of a diamond shaped platelet can align parallel to the length of a leg, which allows the flatter cross section of the plate to align with the flatter plane of the leg, and the greater curve radius of the plate to align with the greater curve of the radius of the leg, which is shown in FIG. 12.

However, the overall area of attachment means 43 is still substantially smaller than the total surface area of the various protective plates or protective elements. Therefore, the composite material remains substantially elastic as well as flexible in any direction.

Figure 23D:
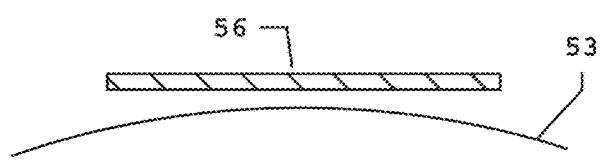
FIG. 23d is a front section view of a flat, rigid protective plate on a curved surface.
Figure 24A:
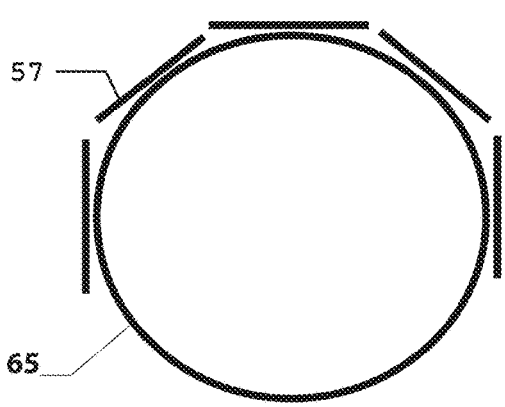
FIG. 24a is a schematic front view of five flat rigid protective plates on a curved surface for illustration, and not part of this invention.
Figure 24B:
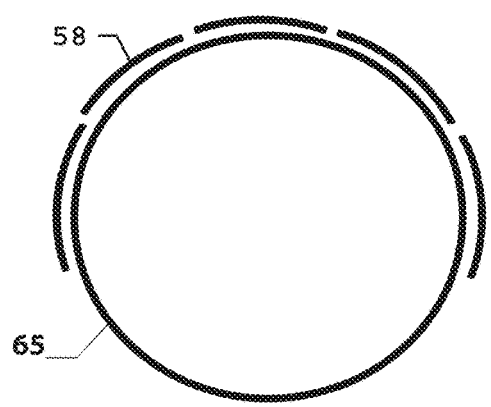
FIG. 24b is a schematic front view of five curved protective plates on a curved surface.
Figure 25A:
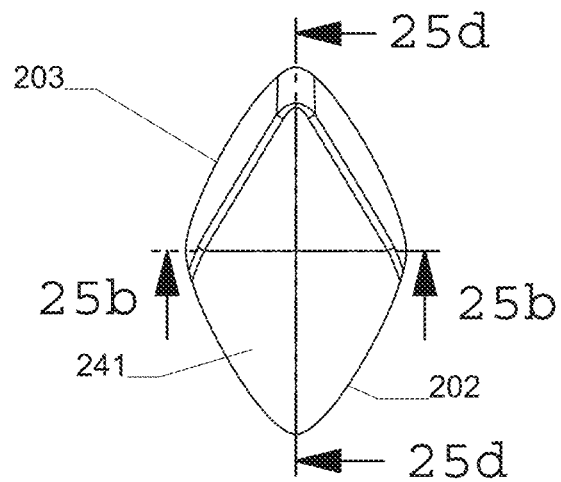
FIG. 25a is a top plan view of a second embodiment of a protective plate used in any embodiment of the composite material according to the invention.
Figure 25B:
Figure 25C:
Figure 25D:

The curvature of the protective plate 41 as shown in FIGS. 23a to 23c allows the protective plate 41 to conform to a curved object 53 covered by the composite material 10. As shown in FIGS. 24a and 24b, this reduces exposure of the base layer 48 to a threat 78 and reduces the risk of snagging equipment on an edge of the protective plates 41. The curvature of the protective plates 41 in two directions allows the protective plates 41 to conform to a multi-directionally curved object 65, as shown in FIGS. 2 and 3b, while also conforming to one another in a relatively flat plane, as shown in FIG. 22b. Flat, rigid protective plates would not conform to one another, as well as a curved object 65, as seen in FIGS. 23d and 24a.

The conformity of the protective plates 41 is can also be improved by varying the thickness of each protective plate 41, as shown in FIG. 30. This creates a composite material 10 of substantially constant thickness, improving the aesthetic appearance and hydrodynamic performance of the garment 61.

The selection of appropriately sized protective plates 41 for the garment 61 shown in FIGS. 12 and 13 allows the various protective plates in sizes and shapes, to conform appropriately, in use, to the shape of a user wearing the garment 61, reducing the exposure of the base layer 48 and the user. Further, embedding the protective plates 41 in the material 71 of the base layer 48, as shown in FIG. 6, can reduce the overall thickness of the composite material 10.

The perforations 44 in the protective plates 41 make the composite material 10 lighter, increasing the utility of the garment 61. The perforations 44 also increase the permeability of the composite material 10 to air and moisture further increasing the utility of the garment 61. It also serves to make the composite material significantly more breathable, which can improve the garments overall comfort and wearability in applications out of the water. The perforations 44 are also adapted to prevent the sharp-edged pointed threat 78 from moving across the protective plate 41, attempting to find an interstitial space between adjacent protective plates 41. Other irregular surfaces, such as disclosed in FIGS. 34a to 36c and FIGS. 28a to 32b also present an irregular surface to the threat 78, which prevents the threat 78 from moving across the surface of the protective plate 41, and thereby finding a gap between adjacent protective plates 41. Ideal arrangements of perforations or irregularities prevents a straight line 2010 from traversing the surface plane of the platelets without encountering said perforation or irregularity, as shown in FIGS. 29a and 32a. This significantly increases the safety of the garment 61 as the composite material 10 is able to conform to the threat 78 and distribute the load across a number of protective plates 41. Further, custom perforations 42 allow for various pleasing shapes of perforations 44 to be made in a given protective plate 41, which preserve a critical minimum edge distance to the perimeter edge of a protective plate 41 to maintain structural integrity of the protective plate 41.

Further, as disclosed in FIGS. 34a to 36c, V-like shapes developed through the taper 79 and/or overlapping of various sized perforations 44, or nesting of various ring shaped protective platelets 1029, 1038, 1039, assist in both impinging the threat 78, and more closely conforming to the threat 78, to distribute the load more evenly from a larger surface area of the protective plates 41 engaged with the threat 78, thus increasing the performance of the composite material 10 when engaged by the threat 78. Similarly the protective plate 1041 shown in FIGS. 36a to 36c engages the threat 78 by allowing the base material 48 to deform as it is engaged by the threat 78, while each of the rings 1029, 1038, 1039 engage a portion of the threat 78 to distribute the load across the composite material 10 and prevent the threat 78 from moving across the garment 61 and finding a weakness in the composite material 10.

The increased buoyancy provided by the buoyant material 86, and/or the air-filled perforations 44, or in entrapped air or buoyant material through the protective plate 41, or in additive buoyant layers 1551 increases the utility of the garment 61 in water sport or lifesaving applications.

The expansion prevention means, that are the slotted link 94, the protrusion 98 and the limitedly elastic base layer 148, each act to prevent the base layer 48 from expanding such that the protective plates 41 no longer overlap. By limiting the maximum state of expansion of the composite material 10, the expansion prevention means ensure that the protection plates 41 do not exceed the designed overlap and prevent the opening of gaps between protective plates 41, that could expose the base layer 48, or the user wearing the garment 61.

The various stiffening means disclosed in FIGS. 38a to 42b assist in keeping the protective plates 41, and thereby the composite material 10, outstretched and expanded, to minimise presentation of any gaps between the protective plates 41, and also preventing rolling or folding of edges of high strength materials which reduces their outstretched surface area. This means includes various infusing or encapsulation agents, bonding relatively stiffer layers 1551, the elongation elements 1655, 1654, and the perimeter elongation element 1741.

The increasing hardness of layers 1859, 1858, 1857 allows the threat 78 to more greatly deform the outer layer 1859, and the intermediate layer 1858, which enables the composite material 10 to present more surface area to the threat 78, distributing the load. This deformation also effectively traps the point of the threat 78 if it moves side to side, which is common in some threat scenarios. Similarly, the irregular surface 1963 shown in FIG. 44a allows the more effective locking of the threat 78 to the composite material 10 to prevent side to side movement of the threat. The sacrificial layer 1970 may be used to protect a user wearing a garment 61 constructed form the composite material 10 using the protective plate 1941 from the irregular surface 1963. It can also prevent unwanted abrasion to a cover layer on the outward side. It also improves the hydrodynamic performance of the garment 61. However, as the sacrificial layer 1970 is sufficiently soft, the threat 78 may penetrate the layer and engage with the irregular surface 1963 as intended.

The platelet assembly embodiments shown in FIGS. 7a to 11c use a carrier layer 90 or links between smaller protective plates 41 to create an individual assembly larger than the individual platelets within. This assists in the ease of manufacture of the garment 61. The embodiment shown in FIGS. 9a to 9c uses a two-dimensional array of protective plates 41 to create a larger two dimensional array of protective plates 41 to be used in the manufacture of the garment 61. Instead of applying each protective plate 41 individually to a base layer 48, a number of the protective plates 41 may be combined, which then allows the attachment of the number of protective plates 41 to the base layer 48 using a single base layer attachment 43. This substantially reduced the required manufacturing steps to construct the garment 61. The attachment to the cover layer 49, if desired, is similarly simplified by using a single cover layer attachment 50. The infused or partially infused carrier array depicted in FIGS. 38d and 38e, shows a high strength material with a bonding agent that can be semi flexible or rigid, but allowing gaps 1377 in the bonding agent which gaps essentially create a hinge or living hinge. In this carrier array, numerous platelet shapes can be cast into the high strength material, with a plurality of gaps between, so that the carrier array can feature hard or semi rigid plates and yet the overall carrier array is flexible and pliable, as shown in FIG. 38e.

By utilizing opposing attachment arrangements, such as depicted in FIGS. 5a, 5b, 7b, 7c, etc, larger flexible plates can be held substantially outstretched by way of the opposing attachments. This can also be achieved by elastic connections from substantial poles or corners of individual platelets (including carrier arrays) as shown in FIG. 10. This serves to keep larger flexible platelets outstretched, helping to prevent rolling or folding of edges.

Although the invention has been described with reference to specific examples, it will be appreciated by those skilled in the art that the invention may be embodied in many other forms. There are various embodiments of; the composite material (layers, side by side arrangements, etc.), protective plates (different shapes, sizes, radiuses, irregular surfaces, etc.) and protective elements (two-dimensional arrays, linked arrays, cast arrays, layered assemblies, etc.) attachment means (elongated lines, curves, shapes, multiple shapes, in one or more axis) which may be combined in various combinations to create composite materials that are flexible and, preferably, elastic.

Attachments to leading edges and not trailing edges, serves to essentially hide all attachments from external view, which can be seen in FIGS. 46b and 49 (attachments visible from underside), and from FIGS. 1 and 2 where attachments are not visible. This can enhance the visual appeal of the material, and serves to shield the attachments from damage.

Utilizing various embodiments of flexible platelets, as depicted in FIGS. 38a to 42b, can allows larger and or more pliable platelets to be utilized where the flexible platelets can individually flex to conform to the shape below. Utilizing carrier array, linked array, or infused array platelet assemblies shown in FIGS. 7a to 11c, and also in FIGS. 38d and 38e, also allows larger and or more pliable platelet assemblies to be used, which can enhance manufacture of materials and garments by reducing the total number of attachments to base and cover layers. These arrangements can use bonded rigid or semi ridged pluralities of platelets flexibly linked together, or bonded to a flexible base leaving living hinges, or intermittently bonded or infused

What is claimed is:

1. A cut and puncture resistant composite material comprising;
    at least one elastic layer,
    at least two protective elements each having a smaller surface area than the surface area of said elastic layer,
    at least one attachment between each said protective element and said elastic layer, wherein the surface area of each attachment is substantially smaller than the total surface area of each protective element; and
    wherein an attachment area between each said protective element and said elastic layer is at least $\frac{1}{12}$ of the perimeter length of each protective element and the attachment area between each said protective element and said elastic layer is less than 50% of the total area of each said protective element,
    wherein each attachment substantially restricts the misalignment of each protective element relative to the elastic layer while maintaining substantial elasticity.

2. The cut and puncture resistant composite material of claim 1, wherein said attachment comprises:
    at least two attachments between each said protective element and said elastic layer.

3. The cut and puncture resistant composite material of claim 1, wherein the composite material comprises:

a second elastic layer occurring on the opposite side of said protective elements relative to a first elastic layer and, a second attachment between each said protective element and said second elastic layer, at a location substantially opposite the location of said attachment to said first elastic layer.

4. The cut and puncture resistant composite material of claim 1, wherein each said protective element is comprised of:
    at least one layer of flexible material,
    at least one layer of resilient material attached to said flexible material, which said resilient material is positioned at least one of the following locations:
    substantially at the perimeter edge of said protective element and not substantially covering the center surface area of said protective element,
    substantially along a first central axis of the protective element and substantially along a second axis substantially perpendicular to said first central axis, wherein the total surface area of said resilient material is less than the total surface area of the protective element.

5. The cut and puncture resistant composite material of claim 1, wherein the maximum elongation of said cut and puncture resistant composite material is limited by selecting the at least one elastic layer to achieve a specific maximum elongation such that:
    when said at least one elastic layer is at rest, said protective elements overlap at their adjacent edges; and
    when said at least one elastic layer is at maximum elongation, each said protective element is at least in contact with an adjacent protective element.

6. The cut and puncture resistant composite material of claim 1, wherein a maximum elongation of the composite material is limited by an engagement between:
    a first protective element's perimeter edge with a retaining feature; and
    a second adjacent protective element's perimeter edge with a corresponding retaining feature,
    whereby said engagement prevents further relative motion between the two protective elements.

7. The cut and puncture resistant composite material of claim 1, wherein said elastic layer is discontinuous.

8. The cut and puncture resistant composite material of claim 1, wherein each said protective element is rigid, and shaped to conform to at least one of:
    an adjacent said protective element at overlap locations to adjacent said protective elements,
    and underlying objects shape, which said cut and puncture resistant composite material is overlaying.

9. The cut and puncture resistant composite material of claim 1, wherein an outward-facing of each said protective element has a low coefficient of friction.

10. The cut and puncture resistant composite material of claim 1 wherein each said protective element is porous in it's volume, and substantially not porous at it's external surface area.

11. The cut and puncture resistant composite material of claim 1 wherein each protective element comprises a rigid material located substantially at the perimeter edge of said protective element, and not substantially in the central surface area.

12. The cut and puncture resistant composite material of claim 1, wherein each said protective element has a substantially two-dimensional shape with an aspect ratio of approximately 2:1.

13. The cut and puncture resistant composite material of claim 1 wherein an outward-facing surface of each protective element includes at least one feature that impedes the lateral movement of a pointed object across said outward-facing surface.

14. The cut and puncture resistant composite material of claim 1, wherein each said protective element comprises:
    at least two protective platelets, each with a surface area less than the total surface area of the protective element, and
    at least one flexible connection between each said protective platelet and an adjacent other protective platelet,
    whereby the combined total surface area of the multiple said protective platelets is approximately equal to the total surface area of said protective element.

15. The cut and puncture resistant composite material of claim 14, wherein said flexible connection comprises:
    a layer of a first flexible material with a surface area approximately equal to said protective element,
    an attachment of a second protective element to a second flexible layer and,
    a gap between adjacent protective platelets perimeter edges functioning as a living hinge.

16. The cut and puncture resistant composite material of claim 14, wherein said protective element is comprised of:
    a layer of flexible material with a surface area approximately equal to the surface area of said protective element, and
    a bonding agent applied to a second flexible material in the form of at least two adjacent, substantially two-dimensional shapes,
    wherein the bonding agent is absent in voids between adjacent two-dimensional shapes, allowing said flexible material to function as a living hinge in said voids.

* * * * *